US007153076B2

(12) United States Patent
Parker et al.

(10) Patent No.: US 7,153,076 B2
(45) Date of Patent: Dec. 26, 2006

(54) METHOD OF APPLYING A WRAP SHEET TO A BOOK HARDCOVER AND RELATED GUIDE APPARATUS

(75) Inventors: Kevin P Parker, Berkeley, CA (US); Wayne Kasom, Oakland, CA (US); Camellia M. George, San Francisco, CA (US)

(73) Assignee: Powis Parker Inc., Berkeley, CA (US)

( * ) Notice: Subject to any disclaimer, the term of this patent is extended or adjusted under 35 U.S.C. 154(b) by 114 days.

(21) Appl. No.: 10/968,357

(22) Filed: Oct. 19, 2004

(65) Prior Publication Data

US 2006/0083604 A1 Apr. 20, 2006

(51) Int. Cl.
*B42C 11/00* (2006.01)
*B42C 9/00* (2006.01)
*G01B 3/14* (2006.01)
*B43L 7/00* (2006.01)

(52) U.S. Cl. ..................... 412/4; 412/9; 412/33; 412/8; 412/37; 33/562; 33/566

(58) Field of Classification Search .................... 412/1, 412/4, 5, 8, 9, 16, 17, 19, 33, 37; 33/562, 33/563, 565, 566
See application file for complete search history.

(56) References Cited

U.S. PATENT DOCUMENTS 2,294,347 A 8/1942 Bauer .......................... 154/46
3,715,260 A 2/1973 Dornemann et al. .... 156/477 B
3,749,422 A 7/1973 Abildgaard et al. .......... 281/21
3,816,866 A 6/1974 Miaskoff et al. ................. 11/3
3,847,718 A 11/1974 Watson ........................ 161/39
3,964,770 A 6/1976 Abildgaard et al. .......... 281/29
RE29,105 E 1/1977 Miaskoff et al. ................. 11/3
4,126,982 A 11/1978 Ito et al. ....................... 53/593
4,129,914 A 12/1978 Jahn ................................ 11/2
4,184,218 A 1/1980 Hawkes ..................... 11/1 AD
4,299,410 A 11/1981 Jukola ...................... 281/21 R
4,314,716 A 2/1982 Errichiello ................... 281/29

(Continued)

FOREIGN PATENT DOCUMENTS

CA 991219 6/1976 .................... 281/6

(Continued)

OTHER PUBLICATIONS

PCT Publication No. WO 99/39917, Publication Date Aug. 12, 1999.

*Primary Examiner*—Monica Carter
*Assistant Examiner*—Pradeep Battula
(74) *Attorney, Agent, or Firm*—Girard & Equitz LLP

(57) ABSTRACT

Apparatus for forming and applying a wrap sheet to a hardcover for a bound book, including a planar guide having a width and length selected such that the planar guide can be uses as a template for cutting the wrap sheet. A reticule is disposed on the planar guide, with the guide being preferably transparent in at least the region of the reticule, for aligning the guide over the uncut wrap sheet. Anti-skid members are disposed on one side of the planar guide so that the guide will not tend to move during the cutting. A lip member is disposed on a surface of the guide, opposite the anti-skid members, which is used to assist in aligning the guide over the hardcover so that the guide can also be used for positioning and securing the cut wrap sheet onto the hardcover.

21 Claims, 26 Drawing Sheets

U.S. PATENT DOCUMENTS

| | | | | | |
|---|---|---|---|---|---|
| 4,377,430 | A | | 3/1983 | Bexley et al. | 156/184 |
| 4,420,282 | A | | 12/1983 | Axelrod | 412/4 |
| 4,496,617 | A | | 1/1985 | Parker | 428/55 |
| 4,537,544 | A | | 8/1985 | Joost | 412/5 |
| 4,615,541 | A | | 10/1986 | Kwauka | 281/29 |
| 4,650,216 | A | | 3/1987 | Carlson | 281/34 |
| D293,301 | S | * | 12/1987 | Deering | D10/62 |
| 4,800,110 | A | | 1/1989 | DuCorday | 428/43 |
| 4,898,506 | A | | 2/1990 | Lázár | 412/8 |
| 5,044,857 | A | | 9/1991 | Crudo | 412/19 |
| 5,052,873 | A | | 10/1991 | Parker et al. | 412/13 |
| 5,066,183 | A | | 11/1991 | Tholérus | 412/4 |
| 5,078,563 | A | | 1/1992 | Lolli | 412/8 |
| 5,154,447 | A | | 10/1992 | Tooker | 281/21.1 |
| 5,174,556 | A | | 12/1992 | Taylor et al. | 270/1.1 |
| 5,193,962 | A | | 3/1993 | Parker et al. | 412/8 |
| D335,089 | S | * | 4/1993 | Grubelnik | D10/64 |
| 5,340,155 | A | | 8/1994 | Podosek | 281/29 |
| 5,346,350 | A | | 9/1994 | Luhman et al. | 412/37 |
| 5,364,215 | A | | 11/1994 | Snellman et al. | 412/3 |
| 5,452,920 | A | | 9/1995 | Parker | 281/21.1 |
| 5,569,011 | A | | 10/1996 | Yamaguchi et al. | 412/9 |
| 5,601,312 | A | | 2/1997 | Funkhouser | 281/21.1 |
| 5,601,915 | A | | 2/1997 | Ochi et al. | 428/323 |
| 5,605,425 | A | | 2/1997 | Schaefer | 412/4 |
| 5,613,711 | A | | 3/1997 | Parker | 281/21.1 |
| 5,779,423 | A | | 7/1998 | Bermingham | 412/4 |
| 5,829,150 | A | * | 11/1998 | McEligot | 33/562 |
| 5,829,938 | A | | 11/1998 | Hartwig et al. | 412/8 |
| 5,833,423 | A | | 11/1998 | Yamaguchi et al. | 412/8 |
| 5,997,964 | A | | 12/1999 | Klima, Jr. | 428/1 |
| 6,024,525 | A | | 2/2000 | Yamanaka | 412/36 |
| 6,056,493 | A | | 5/2000 | Hartwig et al. | 412/8 |
| 6,065,884 | A | | 5/2000 | Parker et al. | 400/611 |
| 6,155,763 | A | | 12/2000 | Parker et al. | 412/6 |
| 6,174,120 | B1 | | 1/2001 | Kalisher | 412/1 |
| 6,322,867 | B1 | | 11/2001 | Rush et al. | 428/40.1 |
| 6,418,635 | B1 | * | 7/2002 | Nelson et al. | 33/563 |
| 6,599,074 | B1 | | 7/2003 | Parker | 412/33 |
| 6,619,900 | B1 | | 9/2003 | Cobene, II et al. | 412/1 |
| 6,641,345 | B1 | | 11/2003 | Cobene, II et al. | 412/1 |
| 6,685,415 | B1 | | 2/2004 | Rush et al. | 412/37 |
| 6,709,727 | B1 | | 3/2004 | Parker | 428/40.1 |
| 6,925,724 | B1 | * | 8/2005 | Tandy | 33/563 |
| 2002/0064437 | A1 | | 5/2002 | Kuramoto et al. | |
| 2004/0066030 | A1 | | 4/2004 | Parker | |
| 2004/0067123 | A1 | | 4/2004 | Parker et al. | |
| 2004/0120793 | A1 | | 6/2004 | Parker | |
| 2004/0120794 | A1 | | 6/2004 | Parker | |
| 2006/0115347 | A1 | * | 6/2006 | Parker et al. | 412/19 |

FOREIGN PATENT DOCUMENTS

| | | | | |
|---|---|---|---|---|
| JP | 403227698 | A | 10/1991 | 312/184 |

* cited by examiner

METHOD OF APPLYING A WRAP SHEET TO A BOOK HARDCOVER AND RELATED GUIDE APPARATUS

BACKGROUND OF THE INVENTION

1. Field of the Invention

The present invention relates generally to the field of bookbinding and, in particular, to a method of applying a wrap sheet to the spine of a book hardcover and related guide apparatus.

2. Description of Related Art

It is now possible to print and bind a book using relatively low cost desktop equipment. Such books can approach the quality and appearance of mass-produced bound books, including hardcover books. One such prior art technique uses a binder strip having an adhesive surface, such as disclosed in U.S. Pat. No. 4,496,617. The binder strip is typically applied to a stack of sheets to be bound using a desktop binding machine such as disclosed in U.S. Pat. No. 5,052,873. The binding machine carries out the binding operation by suitably positioning the binder strip relative to the stack to be bound and applying heat and pressure so that the edges of the stack are bound. Next, a hardcover assembly can be applied to the bound stack to provide the finished book. One such typical prior art binding sequence is described below.

Referring now to the drawings, FIG. 1 shows a stack of sheets 15 to be bound. A first folded liner sheet 12, forming sheets 12A and 12B the same size as the sheets to be bound, is positioned on the top of the stack 15 and a second folded liner sheet 14, forming sheets 14A and 14B, is positioned on the bottom of the stack. The liner sheets 12 and 14 are preferably of a relatively heavy stock as compared to the sheets 15 to be bound. Once the liner sheets 12, 14 and stack of sheets 15 have been assembled, the combined stack 10 is bound together using a conventional binder strip 16 as described in U.S. Pat. No. 4,496,617, the contents of which are hereby fully incorporated by reference into the present application. The actual binding is preferably is carried out using a desktop binding machine as described in U.S. Pat. No. 5,052,873, the contents of which are hereby fully incorporated by reference into the present application. The bound stack 10 is shown in FIG. 2, with the adhesive present in the binder strip 16 operating to bind the individual sheets together and to the paper substrate of the binder strip 16.

FIG. 3 shows details of a typical prior art hardcover assembly 18 that is applied to the bound stack 10 of FIG. 2. Usually, the cover assembly 18 is completely assembled and sold separately to the user. As will be described, the cover assembly 18 will be manufactured in various sizes to accommodate differing size stacks 10 in terms of stack thickness and to accommodate different formats such as 8½ by 11 inch formats. A user can request that certain information be preprinted on the assembly 18, including title information and any other graphics. As will be described later, the present invention provides an attractive alternative to preprinting the title information.

The typical hardcover assembly 18 includes the front and back cover sections halves 18A and 18B, respectively, separated by a spine section 18C. The cover assembly includes a pair of relatively stiff cover boards 24A and 24B made of cardboard or the like. The cover boards 24A and 24B are typically 8⅜ inches by 11⁵⁄₁₆ inches for binding 8½ by 11 inch stack 10 and correspondingly smaller for an 8 ½ by 8½ stack. The cover boards are covered with a flexible cover membrane 22, typically fabric, which is folded around the edges of the cover boards, as depicted in FIG. 3. That part of the cover membrane 22 disposed intermediate the opposite edges 25A and 25B of the cover boards is unsupported and is thus relatively flexible. A length of fabric or stiff paper, typically 0.010 inches thick, is preferably disposed in the spine section 18C of the hardcover assembly 18 so as to slightly stiffen the membrane 22 in that location so that a desired shape is achieved when the bound book is opened and closed. The membrane regions 28A and 28B disposed between the respective edges of the spine section 26 and the respective edges 25A and 25B of the cover boards 24A and 24B are referred to as gutter regions. The gutter regions 28A and 28B are each fixed in width at ⅜ of an inch. The gutter regions define the flexible portion of the cover membrane. Alternatively, a spine board (not depicted), made of the same material as the cover boards 24A and 24B and having a shape that generally corresponds to the spine region 26, can be used. The spine board, which is typically 0.088 inches thick, functions to stiffen the spine 26, with spine flexibility being provided by the flexible gutter regions 28A and 28B disposed between the respective edges of the cover boards 24A and 24B and the respective edges of the spine board. When the spine board is used, the gutter region 28A and 28B widths are preferably increased slightly to 7⁄16 of an inch.

The spine region 26 width varies, along with the width of the spine board if one is used, depending upon the width of the stack 10 to be bound. The cover assemblies are preferably prefabricated in various widths to accommodate stacks 10 of various widths as set forth below in Table 1.

TABLE 1

| Model | Spine 26 Width (inches) | Stack Thickness (inches) |
|---|---|---|
| A | ⅜ | To ¼ |
| B | ½ | ¼ to ½ |
| C | ¾ | ½ to ¾ |
| D | 1 | ¾ to 1 |
| E | 1¼ | 1 to 1¼ |
| F | 1½ | 1¼ to 1½ |

The number of available spine widths can be increased or decreased from the values set forth above in Table 1, with a larger number increasing the difficulty of maintaining an adequate inventory and a smaller number detracting somewhat from the appearance of the final product in the spine region.

Referring back to FIG. 3, the cover assembly 18 is prefabricated using a pair of pressure sensitive adhesive sheets structure 30A and 30B. Further details of the adhesive sheets are also shown in FIGS. 4 and 5. Adhesive sheet structures 30A and 30B are dimensioned 8¼ by 10¾ inches when the stack 10 size is 8½ by 11 inches, to cover the interior periphery of the folded portions of the cover membrane 22A and 22B and to further secure the periphery of the membrane to the respective cover boards 24A and 24B. The smaller size of the underlying sheets 32A and 32B of the sheet structure ensures that the folded liner sheets 12A and 14A completely cover sheets 32A and 32B despite any small misalignment. Each sheet structure includes a respective bottom sheets 32A and 32B and an upper major release liner 36A and 36B. A layer of pressure sensitive adhesive 34A and 34B is disposed intermediate that upper liner and bottom sheet. A pressure sensitive adhesive manufactured by National Starch and Chemical Company and marketed under the designation Instant-Lok, type HL PSA 20-81, has been found suitable for this application. The adhesive layers 34A and 34B are preferably 0.003 to 0.004 inches in thickness.

The upper major release liners 36A and 36B are disposed over a majority of the underlying pressure sensitive adhesive layers. Generally, at least 75% of the adhesive layers are covered by the respective upper major release liners 36A and 36B, with a remaining strip of the adhesive along the inner edge of the sheet structures not being covered by the major release liners 36A and 36B. Instead, upper minor release liners 38A and 38B are disposed over the exposed adhesive strips. This relationship is shown schematically in FIG. 5 (not to scale) where a portion of the sheet structure 30B is depicted. As can be seen, the pressure sensitive adhesive layer 34B is disposed between the bottom sheet 32B and upper major and minor release liners 36B and 38B. That portion of the adhesive layer 34B not covered by the upper major release liner 36 is covered by a separate upper minor release liner 38B. The minor release liner 38B is actually positioned contacting the adhesive layer 34B and is secured in place by the adhesive layer. As is well known, all of the release liners 36A, 38A, 36B and 38B are fabricated from a material that only slightly adheres to the pressure sensitive adhesive so that the release liners can be manually separated from the adhesive without damage to the adhesive or the release liners. As part of the prefabrication of the hardcover assembly, conventional case glue 56 (not depicted in FIGS. 4 and 5) is applied to the top of the cover sections 18A and 18B and to the bottom sheets 32A and 32B. The sheet structures are then positioned over the respective cover sections 18A and 18B as shown in FIG. 3 so that the sheet structures will be secured to the cover sections by the case glue. Thus, the sheet structures 30A and 30B are secured to the cover boards 24A and 24B and to the peripheral portions of the cover membrane 22 by way of the case glue. This completes the prefabrication of the hardcover assembly 18.

Referring now to FIGS. 6 and 7, a prior art guide apparatus 40 is used for applying the hardcover assembly 18 to the bound stack. The guide apparatus includes a flat base member having a receiving surface 42 that is somewhat larger that the largest book to be bound when the book is in the open position. A stop member 44 having two orthogonal segments is supported on the upper surface 42 of the base member and extends around two adjacent sides of the base member. A ledge member 46, also having two orthogonal segments, is supported above the stop member 44 and, as can be in FIG. 7, have outer edges 46A which extend past the edge 44A of the stop member a small distance E, with the overhang being typically 0.14 inches. The height of the ledge member above the support surface is great enough to accommodate the thickness of the cover sections 18A and 18B of the cover assembly 18. The ledge member 46 extends along stop member 44 in one direction a distance Y (FIG. 6) that is somewhat smaller than the closed width of the smallest book to be bound. The distance Z, the distance that the ledge member 46 extends along stop member 44 in the other direction, is typically about twice dimension Y.

The guide apparatus 40 also includes two or more vertical stop members, such as 48A, 48B and 48C, with vertical stop member 48A being supported on ledge member 46 about one third of the distance Y of the ledge member from the corner formed by the intersection of the two ledge member 46 segments. Vertical stop member 48B and 48C are at approximate equal distances along the other ledge member 46 segment. As can best be seen in FIG. 7, the vertical stop members each have a planar surface, surface 50C for example, that coincides with the inner edge, edge 44A for example, of the stop member. This configuration also applies to the planar surfaces 50A and 50B of vertical stop members 48A and 48B.

The completion of the book binding sequence will now be described, starting with reference to FIG. 8A. The opened. hardcover assembly 18 is first positioned on the guide apparatus receiving surface 42, with the upper release liners 36A and 36B facing upwards. As indicated by arrow 52, the hardcover assembly is moved along the surface 42 of the guide apparatus until the edges of cover section 18B is positioned under the ledge member 46, abutting the inner edge 44A of the stop member 44, as shown in FIG. 7. Thus, the outer edge 46A of the ledge member 46 will be positioned a fixed distance E from the edge of cover 18B along the full length of both orthogonal segments of the ledge member 46. The outer edge 46A will provide a guide for positioning the bound stack 10, as will be described. Although not shown in FIGS. 8A–8M, the prior art guide apparatus preferably includes a manually activated clamp mechanism that grips the edge of the hardcover assembly 18 and assists in holding the assembly in place. Further, the prior art guide apparatus can include a book thickness measurement apparatus that includes opposing fixed and movable members which define a stack receiving region intermediate the two members. A user can position the stack vertically between the two members and then move the movable member inward toward the fixed member so the spacing between the two members corresponds to the thickness of the stack. A calibrated indicator connected to the movable member provides a reading indicating whether the thickness of the stack falls within the A, B, C, D, E or F category set forth in Table 1 above so that the proper width binder strip can be easily selected.

Once the hardcover assembly 18 is properly positioned on the guide apparatus 40, the user manually separates the upper minor release liner 38B as shown in FIG. 8B from the assembly 18. This will expose a relatively narrow strip of the underlying pressure sensitive adhesive 34B adjacent spine region 26. Next, the bound stack 10 is placed over the upper major release liner 36B, with the edges of the stack engaging edge 46A of the ledge member 46 along both orthogonal segments. FIG. 7 shows the edge of stack 10 engaging edge 46A along one of the two segments. As shown in FIG. 8C by arrows 52, that portion of stack 10 along the exposed adhesive 34B is not placed on the exposed adhesive until the orthogonal edges of the stack are positioned against edge 46A of both segments. Once the correct position is achieved, the stack is forced down upon the exposed pressure sensitive adhesive 34B as shown in FIG. 8D. This operates to secure the folded liner sheet 14A of stack 10 to cover section 18B of the hardcover assembly 18 in a correctly aligned position.

The next step is to secure the remainder of the folded liner sheet 14A of stack 10 to the adhesive 34B of assembly 18. Referring to FIG. 8E, the free edge of stack 10, including liner sheet 14A, is lifted up and rotated away from the upper major release liner 36B. This permits the release liner 36B to be separated from the hardcover assembly 18 thereby exposing the remainder of the pressure sensitive adhesive 34B. As shown in FIG. 8F, the spine portion of stack 10 held down against the hardcover assembly 18 with one hand while stack 10 is rotated over the adhesive 34B with the other hand. As shown in FIG. 8G, the user then presses the stack 10 down on the hardcover assembly 18. This causes the remainder of the liner sheet 14A of the stack to be secured by the remainder of adhesive 34B to cover section 18B of the hardcover assembly 18. The second cover section 18A of the hardcover assembly will now be attached.

Referring to FIG. 8H, the upper minor release liner 38A is next separated from the hardcover assembly 18 thereby exposing a strip of pressure sensitive adhesive 34A adjacent spine region 26. The user then lifts the cover section 18A of the hardcover assembly away from the surface 42 of the guide apparatus and rotates the cover 18A around the spine. As indicated by arrows 54 of FIG. 81, the cover section 18A is positioned so that the edges of the cover section 18A contact the planar surfaces 50A, 50B and 50C of the respective three vertical stop members 48A, 48B and 48C. This is shown in phantom in FIG. 7. The hardcover assembly 18 is then positioned correctly with respect to the bound stack 10. The user then forces the cover section 18A down as shown in FIG. 8J so that an edge of folded liner sheet 12A of stack 10 is secured to the hardcover assembly 18 by way of the exposed strip of adhesive 34A.

As shown in FIG. 8K, the user then lifts cover section 18A up and rotates the cover away from stack 10, with a narrow strip of liner sheet 12A of the stack remaining secured to cover section 18A. This permits upper major release liner 36A to be separated from hardcover assembly 18 thereby exposing the remainder of pressure sensitive adhesive layer 34A. Cover 18A is then rotated back down onto stack 10, where the edges of the cover should again be in contact with the surfaces 50A, 50B and 50C of the respective stops 48A, 48 and 48C as shown in FIG. 8L by arrows 58. The user then presses down on cover section 18A as shown in FIG. 8M thereby securing the cover section 18A to folded liner sheet 12A of stack 10. This completes the binding sequence. FIGS. 9A and 9B show the completed book in a closed position and FIG. 10 shows the book in an opened position, at the last page of the book, so that folded liner sheets 14A and 14B are depicted. Sheet 14A is secured to hardcover section 18B by way of adhesive 34B and sheet 12A at the front of the book is secured to hardcover section 18A by adhesive 34A. The region between the binder strip 16 and the spine region 18C is not attached so that, when the book is opened as shown in FIG. 10, the spine region does not attempt to fold with the binder strip 16. Thus, the book will lay flat when opened and will not tend to fold shut. Further, the spine region 18C will not distort when the book is opened to the same degree it would if the spine region 18C was attached. As previously noted, a fairly stiff fabric strip 29 is positioned in the spine region intermediate the gutter regions 28A and 28B (FIG. 3) so as to hold the shape of the spine region 26 when the book is opened and closed. Fold lines 27A and 27B are formed naturally in the membrane 22 in the regions near the edges 25A and 25B of the cover boards thereby further enhancing the appearance of the final product.

Although the final hardcover book is similar in appearance and quality to a commercial mass-produced book, it would be advantageous to be able to further enhance the appearance of such books using desk-top equipment. This and other advantages of the subject invention will become apparent to those skilled in the art upon a reading of the following Detailed Description of the Invention together with the drawings.

SUMMARY OF THE INVENTION

Apparatus for forming and applying a wrap sheet to a hardcover for a bound book is disclosed. The apparatus includes a generally planar guide having a guide width that is greater than the width of the spine section of the hardcover and less than the sum of the width of the first and second cover sections of the hardcover together with the spine section. The guide length greater than the length of the length of the hardcover spine section. The planar guide includes first and second opposite edges that extend along the length of the planar guide and second and third opposite edges that extend along the width of the planar guide. These dimensions permit the planar guide to be used as a template for cutting the wrap sheet.

The apparatus further includes a reticule disposed along the length of the planar guide, intermediate the first and second edges and equally spaced from the first and second edges, with the planar guide being substantially transparent at least in a location on which the reticule is disposed. The reticule permits proper positioning of the planar guide over the uncut wrap sheet. The apparatus further includes least one anti-skid member disposed on a first surface of the planar guide so that the guide does not slip when the wrap sheet is being cut. Further, a lip member is included that is disposed on a second surface, opposite the first surface, of the planar guide along the third edge, with the lip member extending away from the second surface to form an cover engaging surface parallel to the third edge and substantially normal to the second surface. This feature ensures the proper size of the wrap sheet overhang when the sheet is being applied to the hardcover.

DETAILED DESCRIPTION OF THE INVENTION

Figure 1:
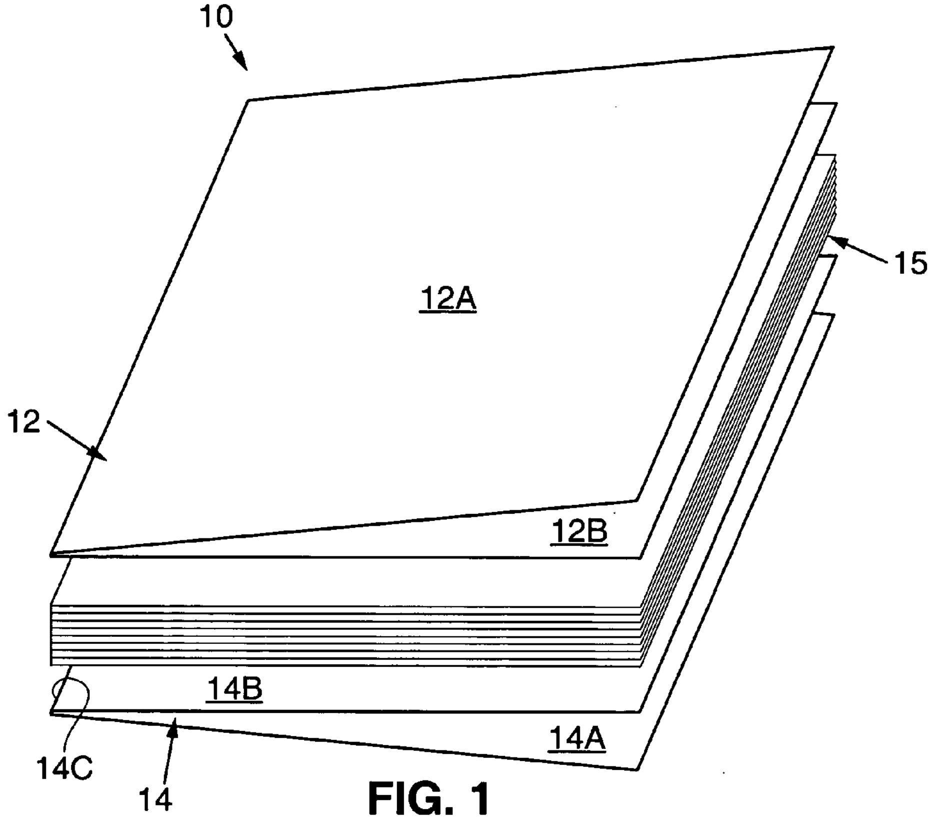
FIG. 1 (PRIOR ART)
FIG. 1 is a perspective view of a stack of sheets to be bound, including the front and back folded liner sheets in accordance with the prior art.
Figure 2:
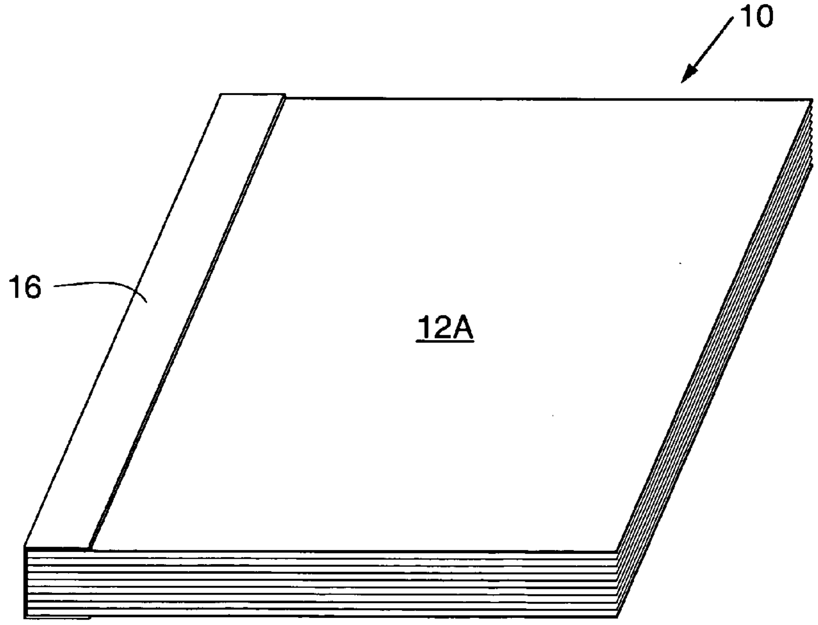
FIG. 2 (PRIOR ART)
FIG. 2 is a perspective view of the stack of sheets of FIG. 1 after binding using a conventional binder strip.
Figure 3:
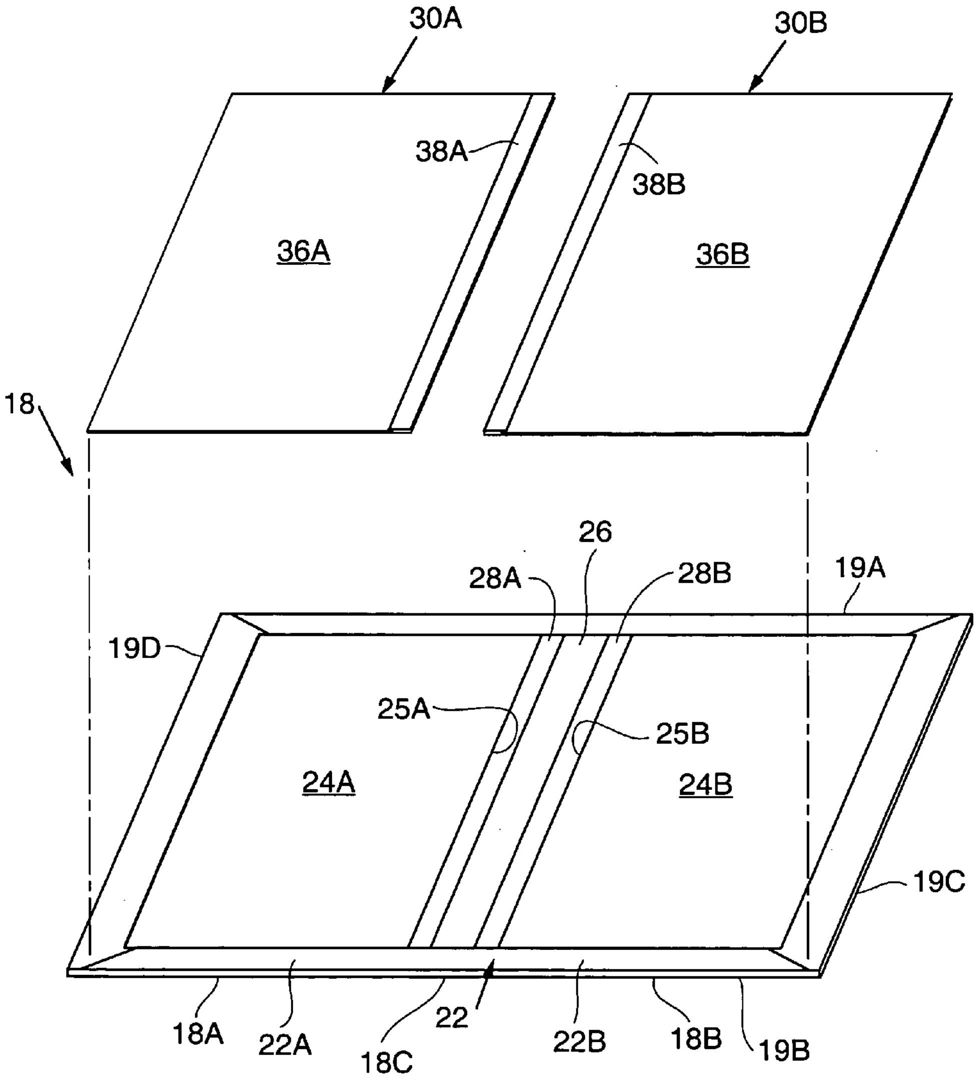
FIG. 3 (PRIOR ART)
FIG. 3 is a perspective exploded view of a prior art hardcover assembly, with the pressure sensitive front and rear sheets structures shown displaced from the remainder of the assembly.
Figure 4:
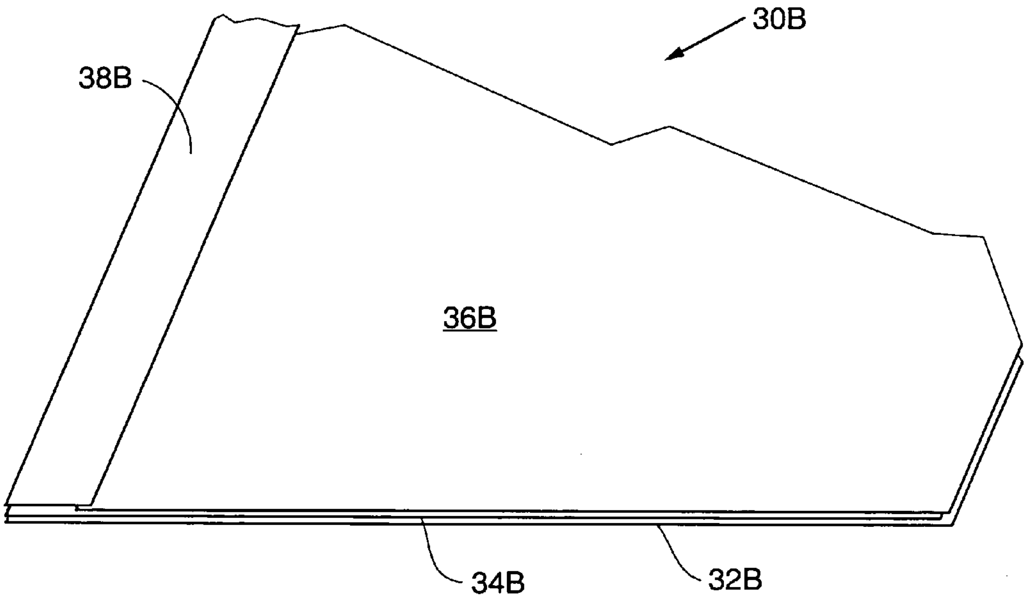
FIG. 4 (PRIOR ART)
FIG. 4 is a perspective view of one of the two prior art pressure sensitive adhesive sheet structures.
Figure 5:
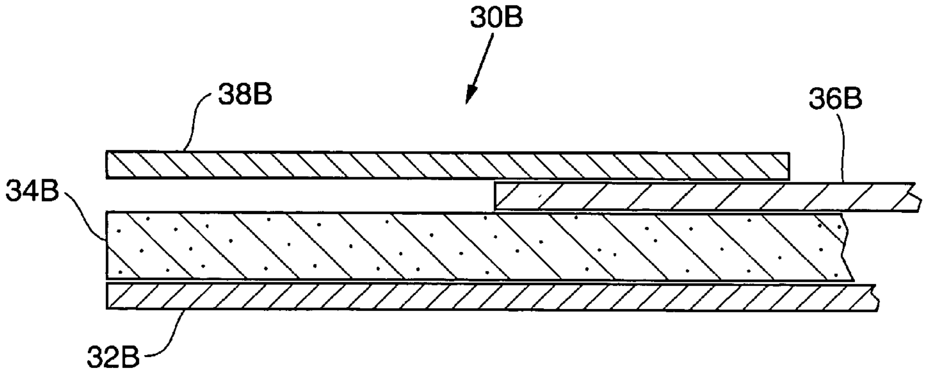
FIG. 5 (PRIOR ART)
FIG. 5 is a cross-section elevational view of a portion of the adhesive sheet structure of FIG. 4.
Figure 11:
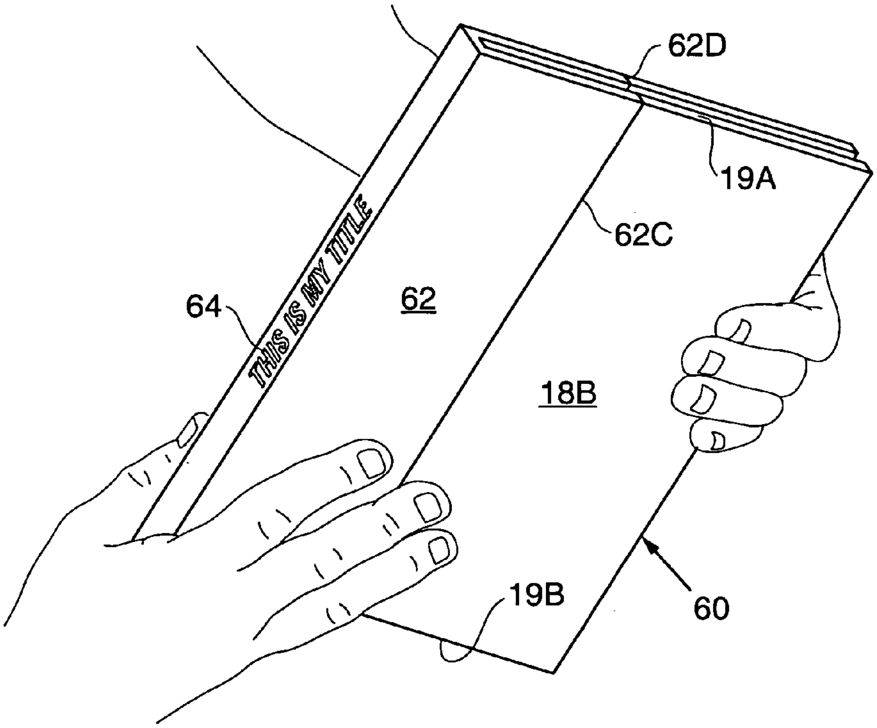
FIG. 11 (PRIOR ART)
FIG. 11 is a perspective view of a book completed in accordance with the subject invention simulating the appearance of a prior art three quarter bound prior art book.

Referring again to the drawings, FIG. 11 shows a bound hardcover book 60 having what is referred to in the present application as a wrap sheet 62. In accordance with one aspect of the present invention, wrap sheet 62 is preferably preprinted with title or other information 64, cut to a predetermined size based upon the characteristics of the book, including book format, and then precisely applied to a bound book using desktop equipment. The wrap sheet is decorative feature which renders an attractive final bound book, similar in appearance to prior art mass-produced prior art books, with such books sometimes being referred to as "three quarter" or "one quarter" bound books in that the spine wrap covers about ¼ of the size of the finished cover. In addition to esthetics, the title or other information printed on the wrap sheet is rendered more durable than information sometimes printed directly on the spine of the cover assembly since the spine can, depending upon the binding method used, be subject to flexing which can eventually damage the printing. The following description relates the manner in which the wrap sheet 62 is prepared and applied to a prior art hardcover assembly such as the previously described assembly 18 shown in FIG. 3. The completed hardcover can then be used to cover a bound stack, as previously described in connection with FIGS. 8A–8M.

Figure 12A:
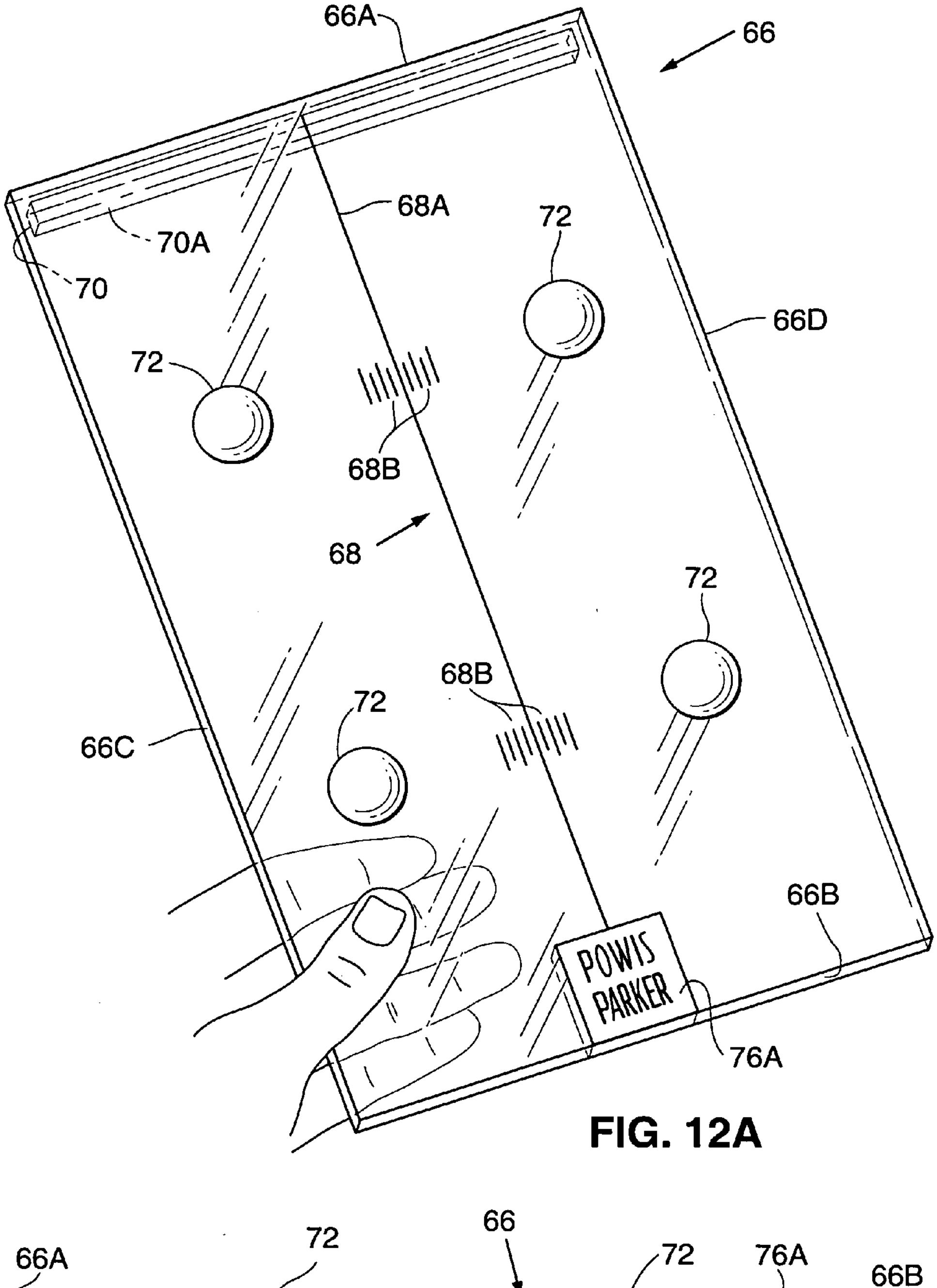
FIGS. 12A and 12B are respective plan and edge views of a guide tool in accordance with one aspect of the present invention.
Figure 12B:
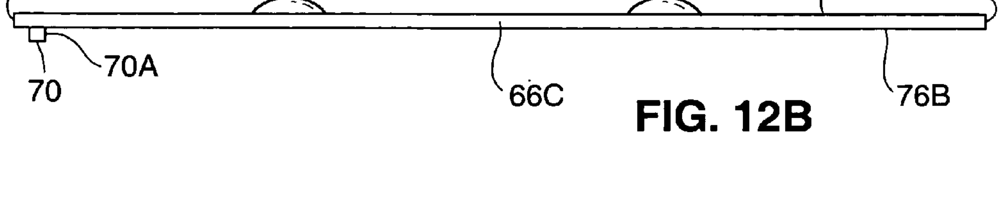

FIGS. 12A and 12B show a guide tool 66 used to form the wrap sheet 62 and to apply the wrap sheet to a hardcover assembly 18. Guide tool is preferably fabricated from transparent acrylic plastic such a Plexiglas® plastic. The outer dimensions of guide tool 66 are selected so that the tool can be used as a template for cutting the uncut wrap sheet. By way of example, a suitable wrap sheet for a 8½ inch by 8½ inch format book calls for a guide tool 66 which is approximately 9.5 inches by 5.9 inches. Other book formats would require a tool 66 having other dimensions that can readily be ascertained by one of ordinary skill in the art based upon the present disclosure.

The transparent guide tool 66 is provided with a reticule 68, which can be printed on the guide, which is used to align the guide over the printed information 64, usually a title, present on the outer side of the uncut wrap sheet. The reticule 68 includes a centerline 68A and outer markings 68B which permit easy centering over titles of varying font size.

As will be described, since both sides of the guide tool 66 are used, both sides include a printed logo 76A and 76B, respectively, thereby reinforcing the concept to the user that both sides are used. Four spaced apart soft rubber anti-skid cushions 72 are disposed on the side bearing logo 76A. A lip 70 is disposed on the other side of the tool, the side bearing logo 76B. The lip 70 defines a surface 70A normal to the centerline 68A, with surface 70A being disposed approximately ⅜ of an inch for the adjacent edge 66A of the guide. As will become apparent, this spacing insures a proper amount of wrap sheet overhang with the wrap sheet is being applied to the hardcover.

Figure 13A:
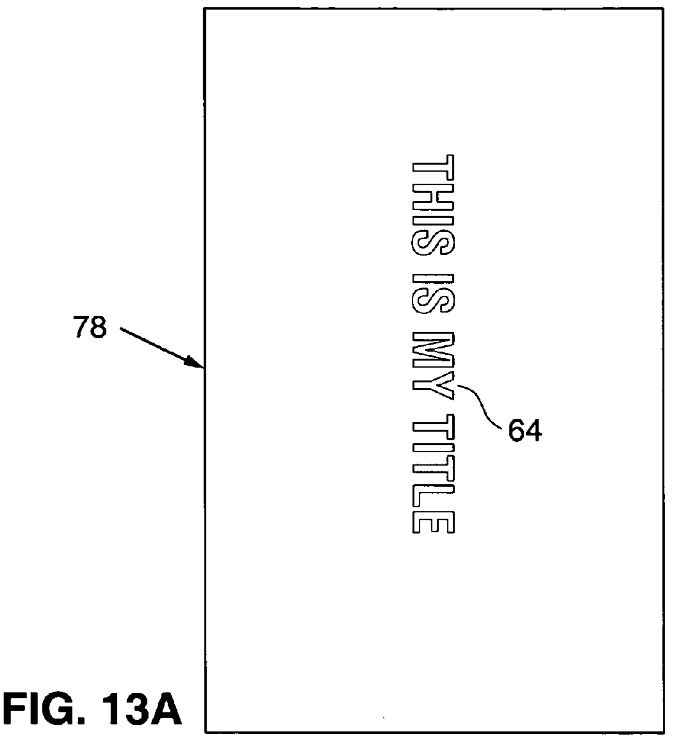
FIGS. 13A and 13B are respective plan and bottom views of an uncut wrap sheet.
Figure 13B:
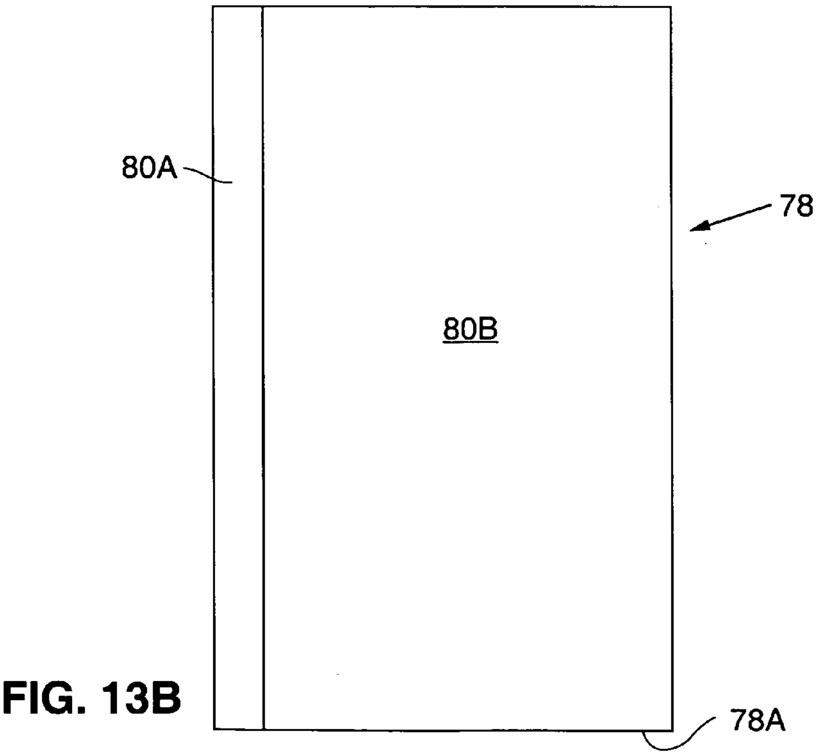

The uncut wrap sheet 78 is shown in FIGS. 13A and 13B. Sheet 78 can be fabricated from a wide range of materials commonly used in bookbinding, including synthetic materials that simulate the appearance of natural materials such as leather. The wrap sheet materials can further selected to match the materials used in the cover membrane 22 (FIG. 3) used to cover the hardcover assembly 18 in terms of texture and color thereby giving the impression that the hardcover was decorated directly. The uncut wrap member 78 is preferably at least one inch larger than the width and height of the guide tool 66, with title or other information 64 being printed down the center of the member. Desktop equipment suitable for printing on the wrap sheet includes a printer marketed by Powis-Parker of Berkeley, Calif. under the trademark Foilfast® which can provide a wide range of fonts types and sizes in a wide range of colors. The font size must be selected such that the title 64 will fit within the spine region of the bound book as shown in FIG. 11. As noted in connection with Table 1, the spine widths can be considered to fall within widths termed A, B, C, D, E and F. As will be explained, the disclosed exemplary implementation of the present invention is limited to width A–E.

The reverse side of the uncut wrap sheet 78 is provided with a layer of pressure sensitive adhesive used to secure the sheet to the book cover. It is possible to purchase suitable material with an underlying layer of pressure sensitive adhesive. Alternatively, an off the shelf pressure sensitive adhesive can be sprayed directly on to the backside of the wrap sheet. As can be seen in FIG. 13B, the adhesive is covered by a pair of release liners including a minor liner 80A and a major liner 80B.

Figure 14:
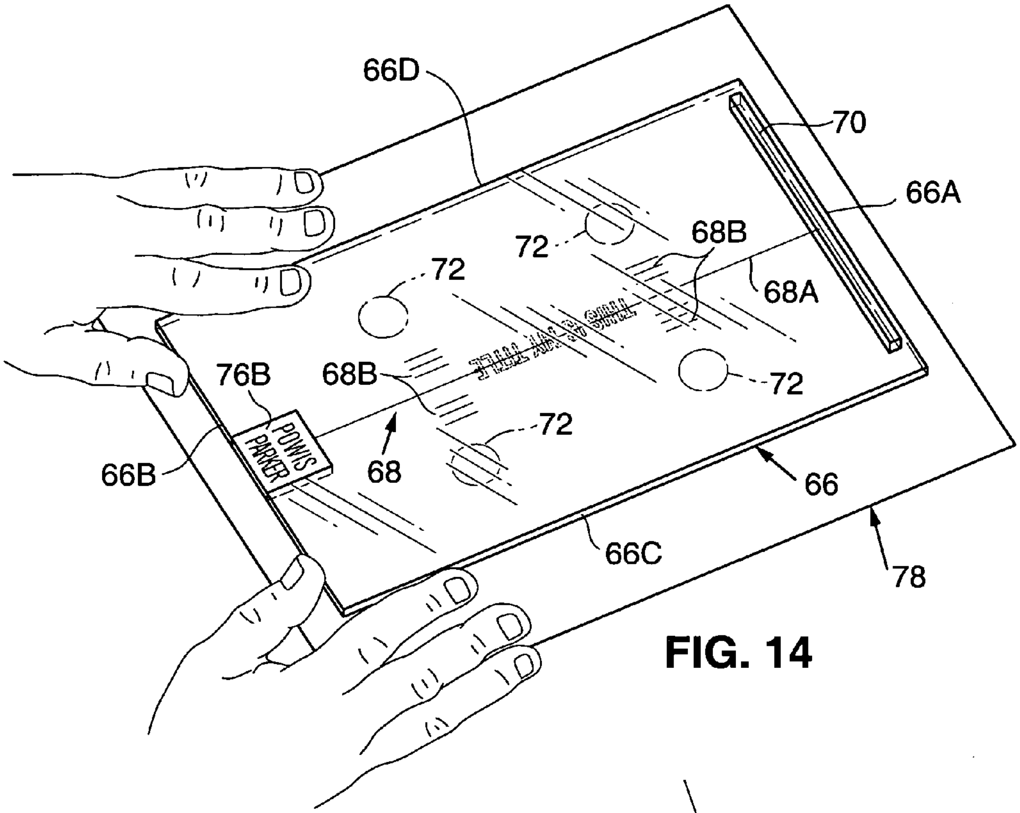
FIG. 14 is a perspective view showing the wrap guide tool positioned over the wrap sheet prior to cutting.

As shown in FIG. 14, the wrap sheet 78 is cut to the proper size to produce the cut wrap sheet 62 using the guide tool 66. The wrap sheet 78 is first placed on a cutting board with the printed information or title up. The tool 66 is placed over the wrap sheet, with the four anti-skid cushions 72 of the tool contacting the wrap sheet 78. Thus, logo 76B is displayed to the user. The reticule 68 of the guide tool 66 is used to accurately align the guide tool with respect to the printed information. For large font text or multi-line text, the smaller outer lines 68B of the reticule can be used. The guide tool 66 position on the wrap sheet in the direction of the center line 68A of the reticule is selected so that the printed information is at the desired location along the length of the final book spine. The overall dimensions of the uncut wrap sheet 78 are selected so that the sheet extends past the periphery of the guide tool 66 on all sides of the tool. It is important that at least part of both the major and minor release liners 80A and 80B fall within the periphery of the guide tool 66.

Figure 15:
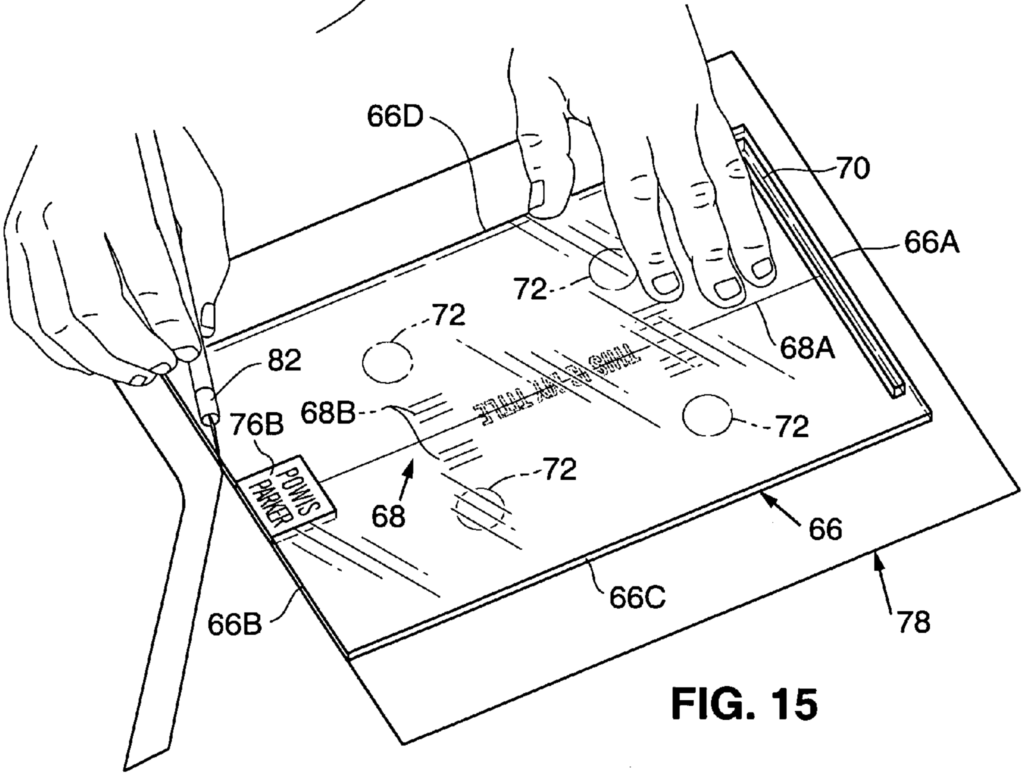
FIG. 15 is a perspective view showing the wrap sheet being cut.

Once the guide tool 66 has been properly located, the user holds the guide tool firmly in place with one hand as shown in FIG. 15. A cutting knife 82, which is held in the other hand, is used to cut the wrap sheet along the entire periphery of the guide, using the guide as a cutting template. The soft cushions 72 assist in holding the guide in place during the cutting.

Figure 30:
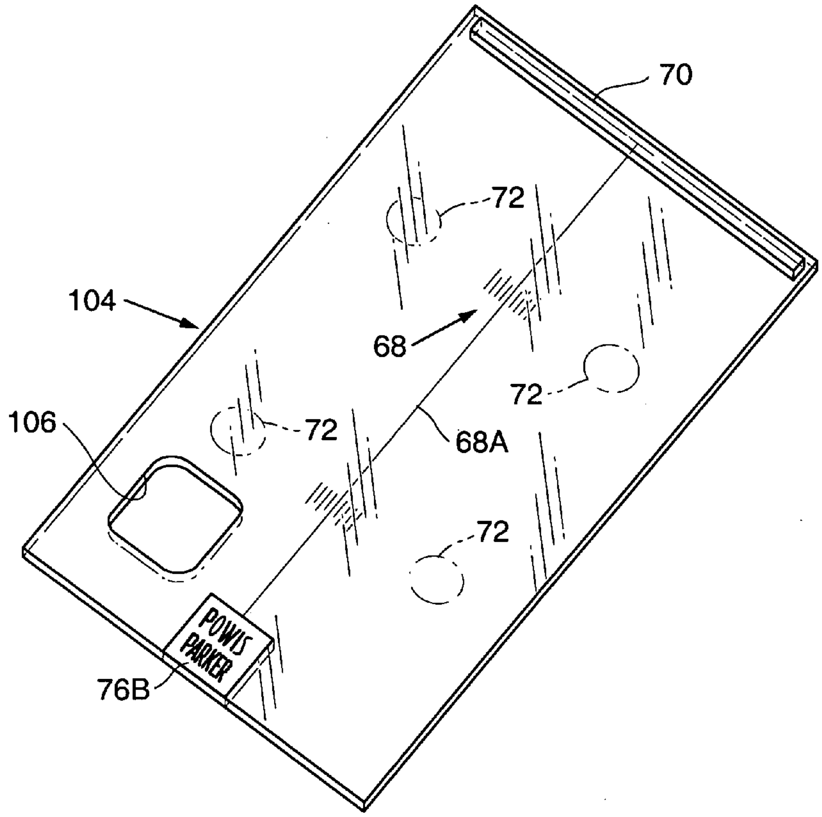
FIG. 30 is a perspective view of an alternative embodiment guide tool having an opening for receiving a user's palm for assisting in stabilizing the guide during the cutting of the wrap sheet.

FIG. 30 shows an alternative guide tool 104 similar to guide tool 66 with the exception of an opening 106 formed in the lower left-hand side of the tool. Opening 106 permits a portion of a user's hand positioned on the guide during cutting, typically the palm, to extend through the opening and contact the underlying wrap sheet 78. This action will further stabilize the guide tool 104 on the wrap sheet so that relative movement of the tool and sheet during cutting is further inhibited.

Figure 6:
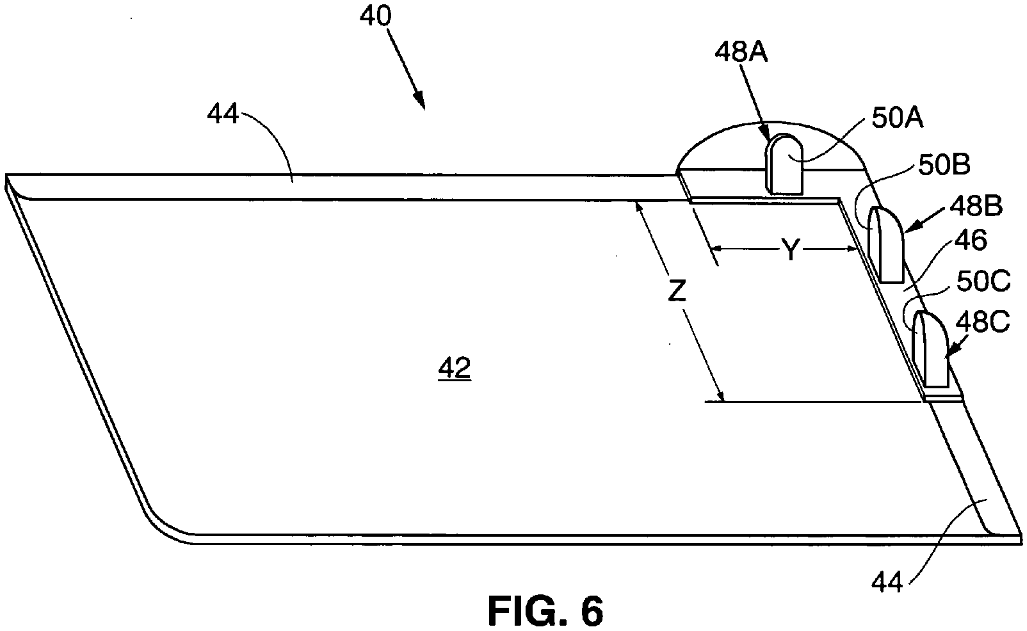
FIG. 6 (PRIOR ART)
FIG. 6 is a perspective view of a prior art guide apparatus used to attach the hardcover assembly to the bound stack.
Figure 7:
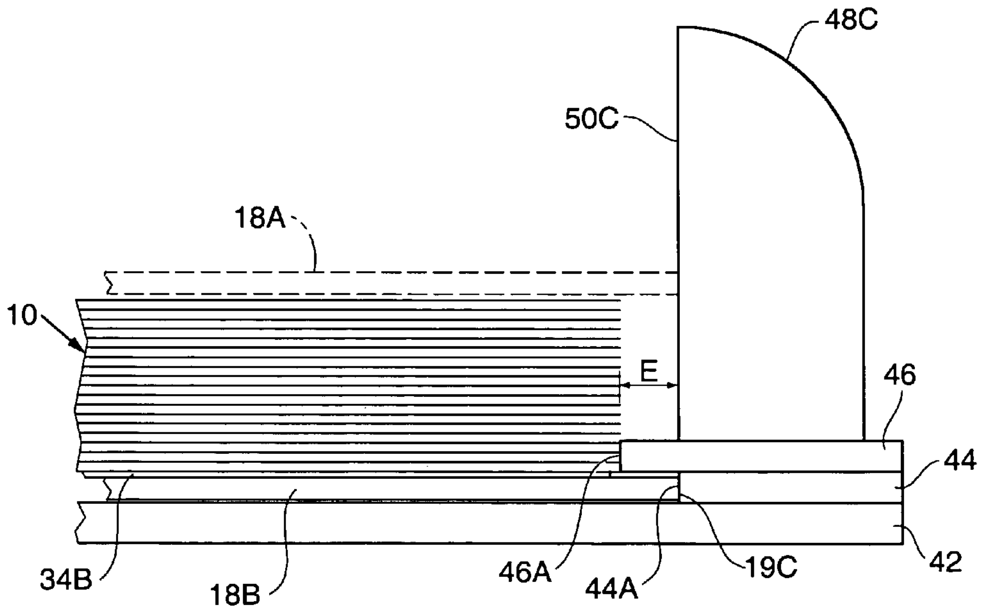
FIG. 7 (PRIOR ART)
FIG. 7 is an expanded side view of a portion of the guide apparatus of FIG. 6 with a stack to be bound shown in position.
Figure 8A:
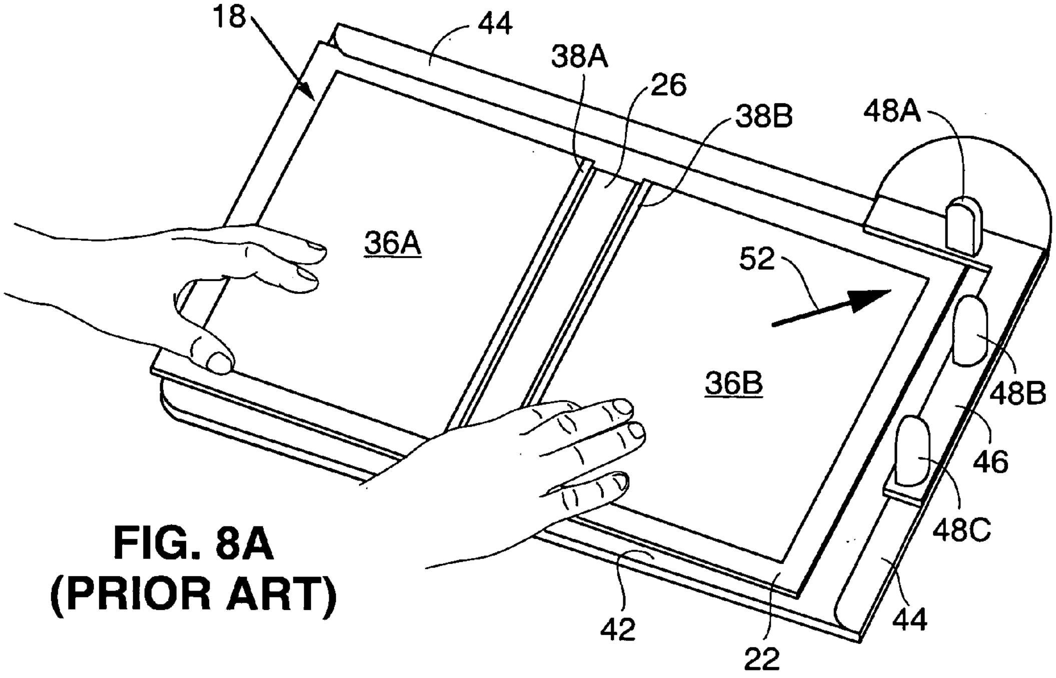
FIG. 8A (PRIOR ART)
FIGS. 8A–8M depict the process for assembling the bound book in accordance with the prior art.
Figure 8B:
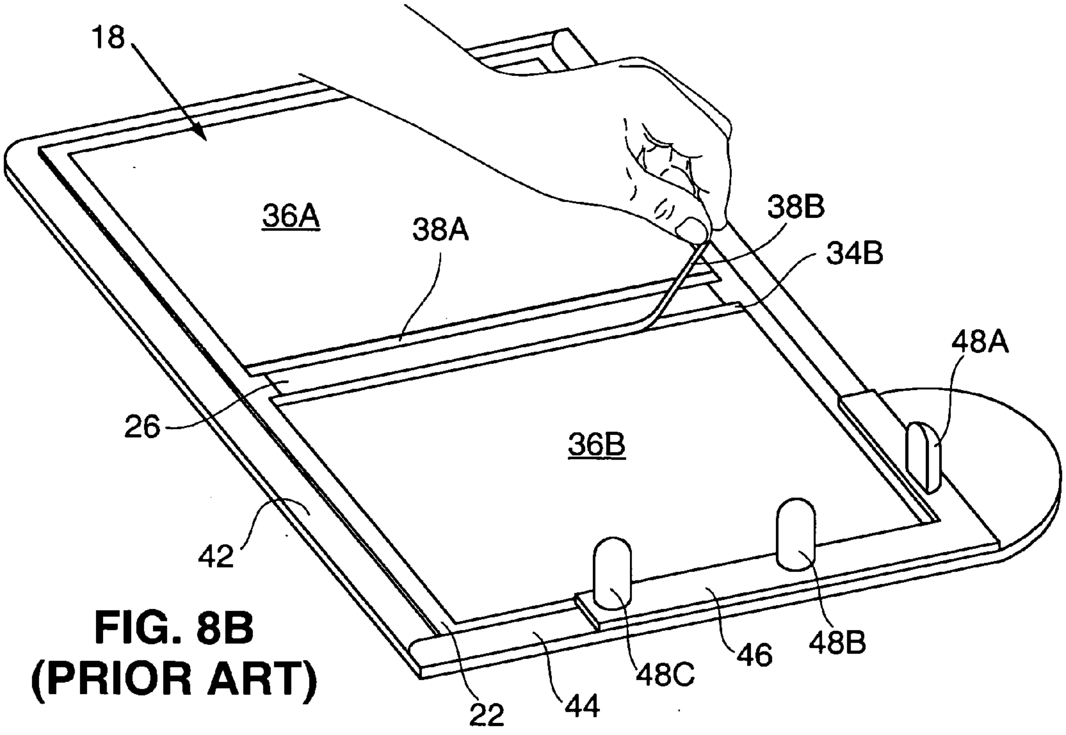
FIG. 8B (PRIOR ART)
Figure 8C:
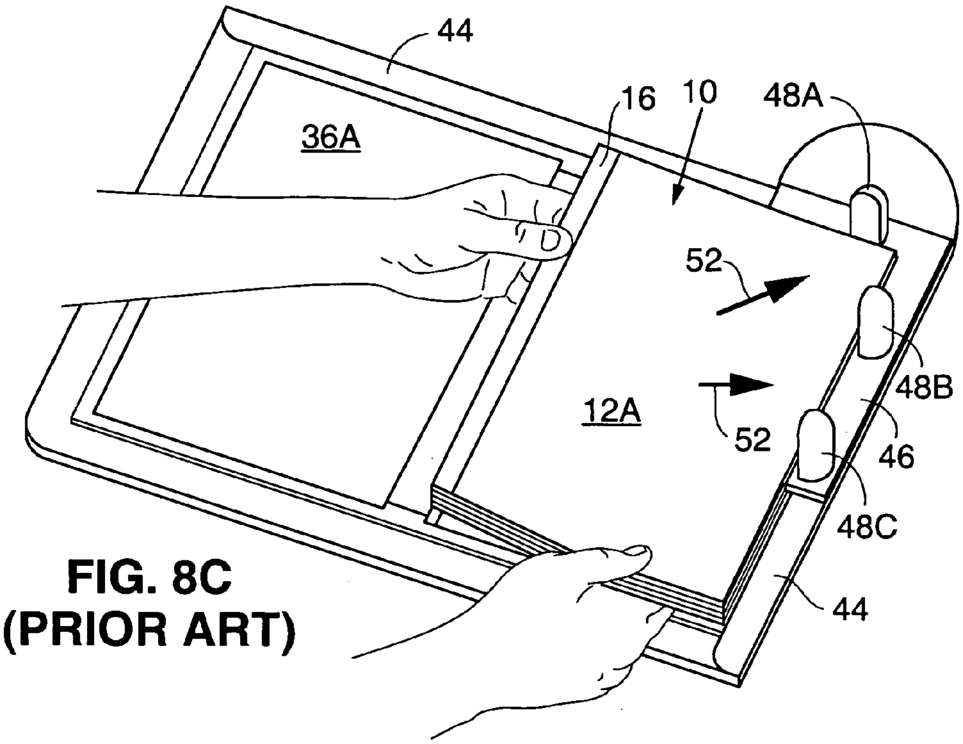
FIG. 8C (PRIOR ART)
Figure 8D:
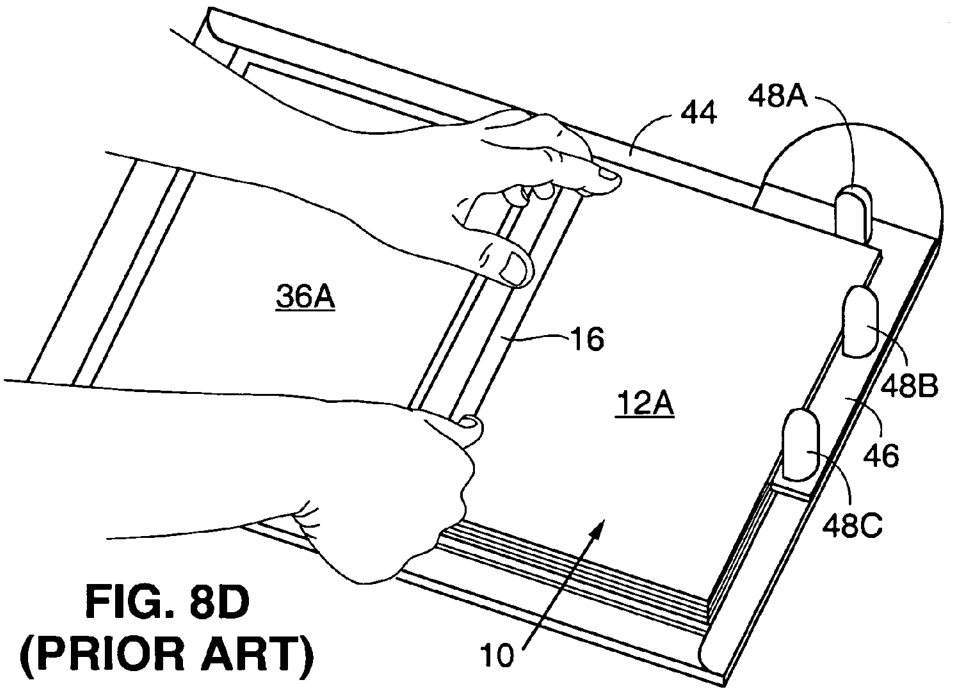
FIG. 8D (PRIOR ART)
Figure 8E:
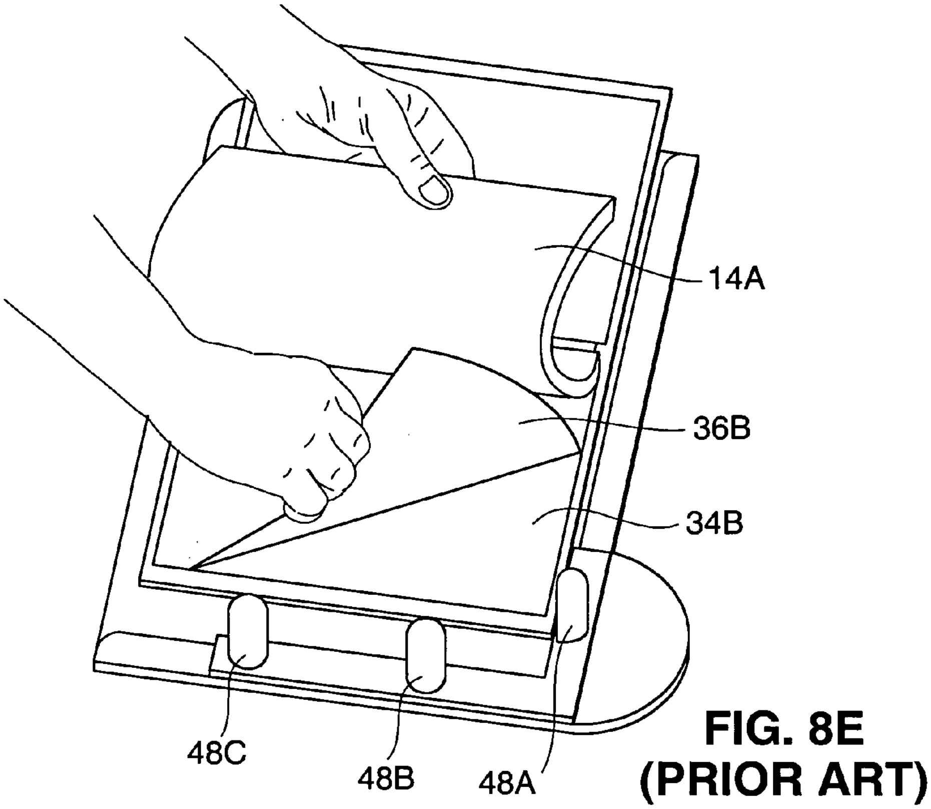
FIG. 8E (PRIOR ART)
Figure 8F:
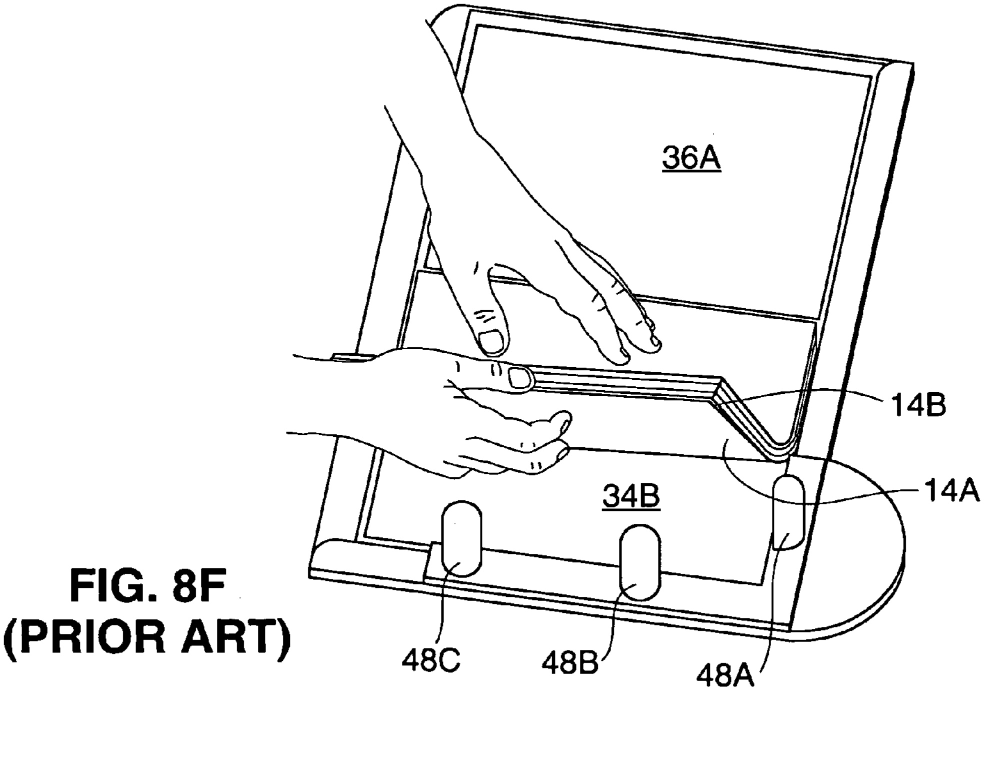
FIG. 8F (PRIOR ART)
Figure 8G:
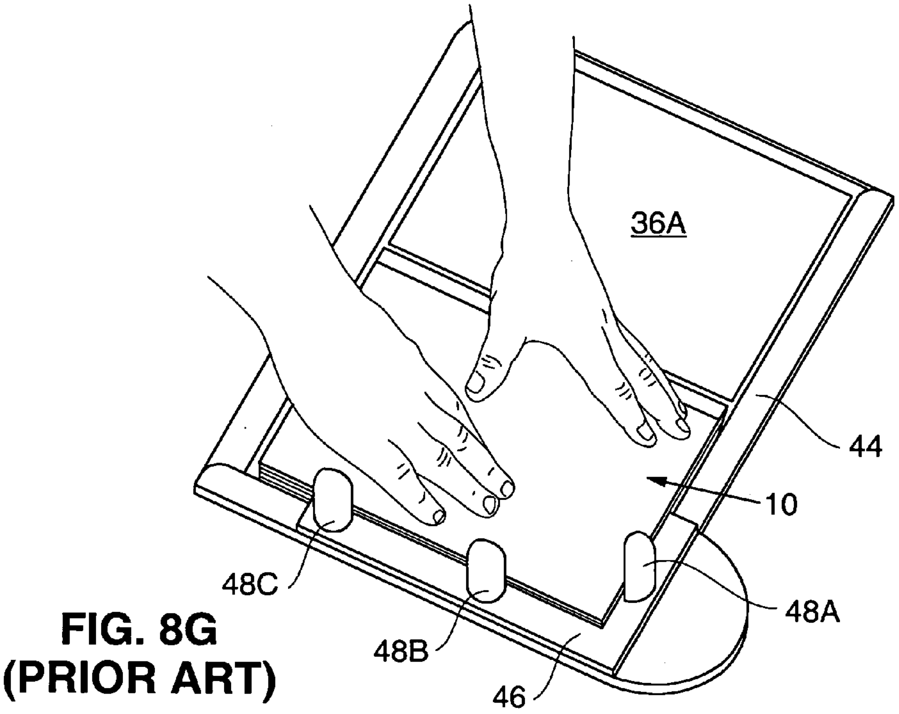
FIG. 8G (PRIOR ART)
Figure 8H:
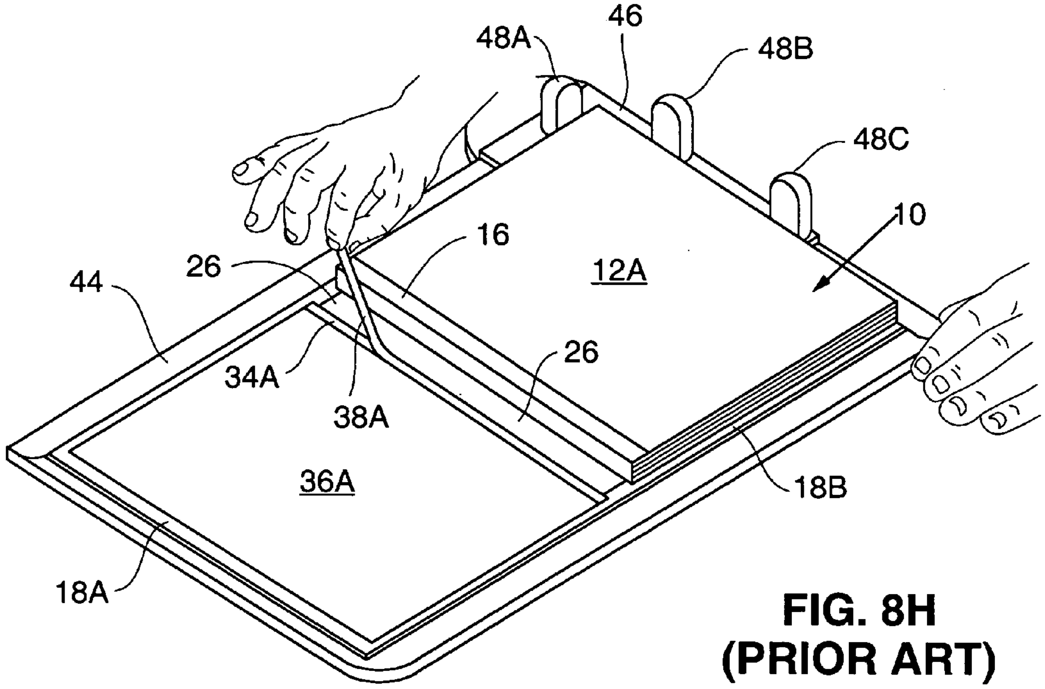
FIG. 8H (PRIOR ART)
Figure 8I:
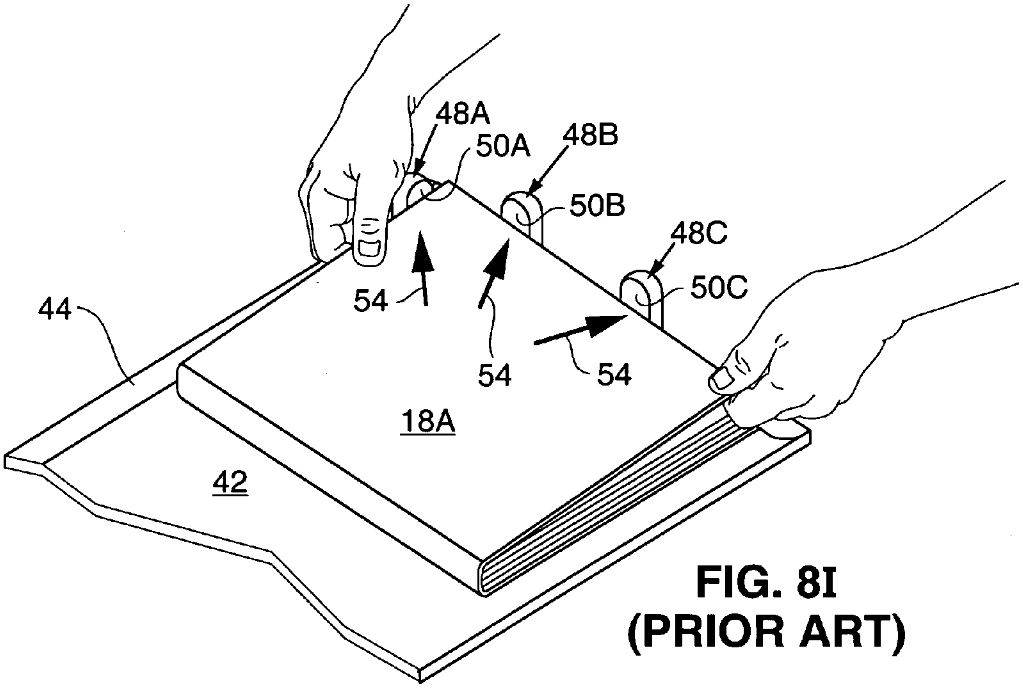
FIG. 8I (PRIOR ART)
Figure 8J:
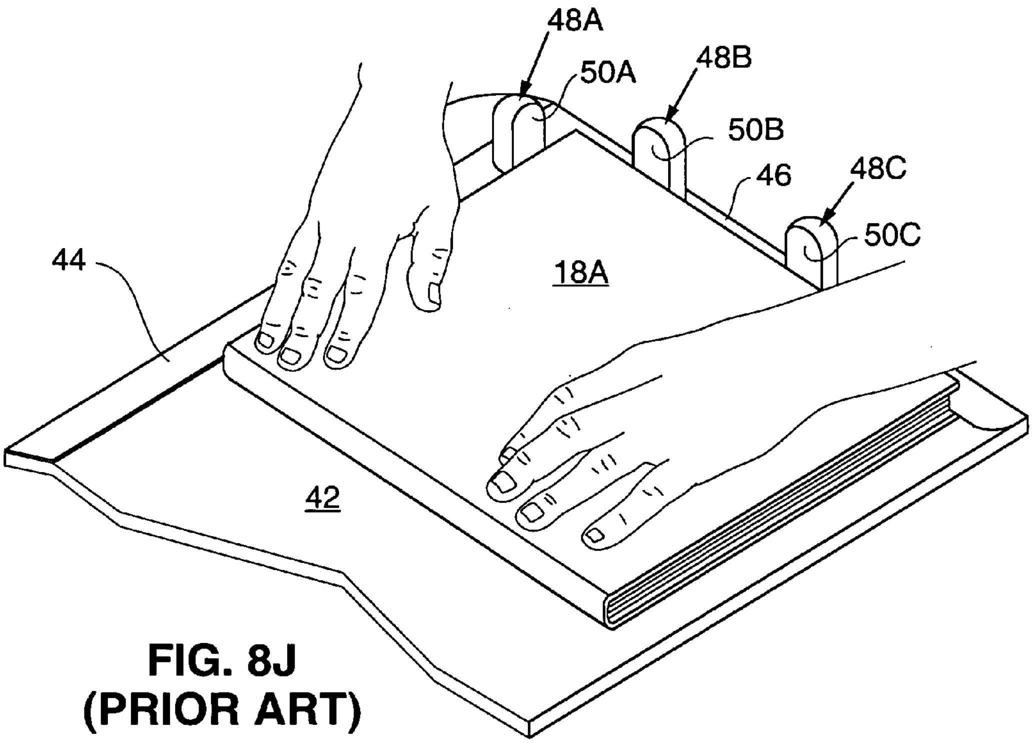
FIG. 8J (PRIOR ART)
Figure 8K:
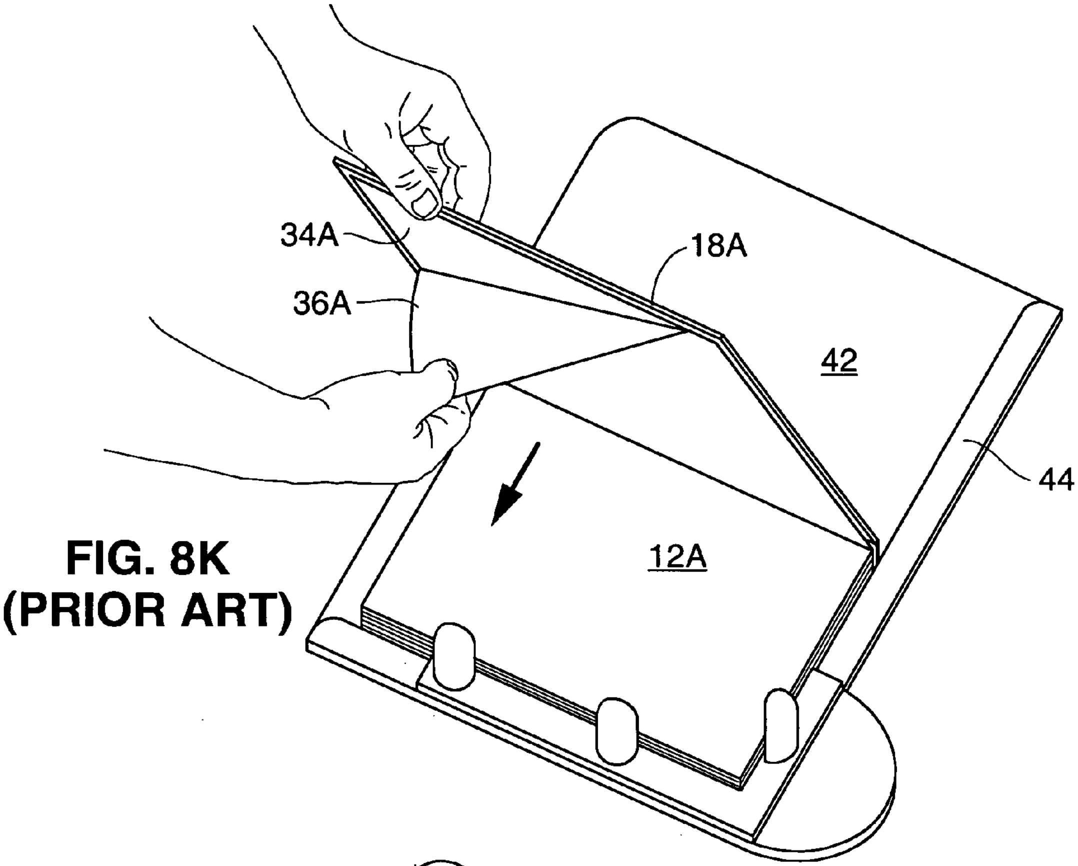
FIG. 8K (PRIOR ART)
Figure 8L:
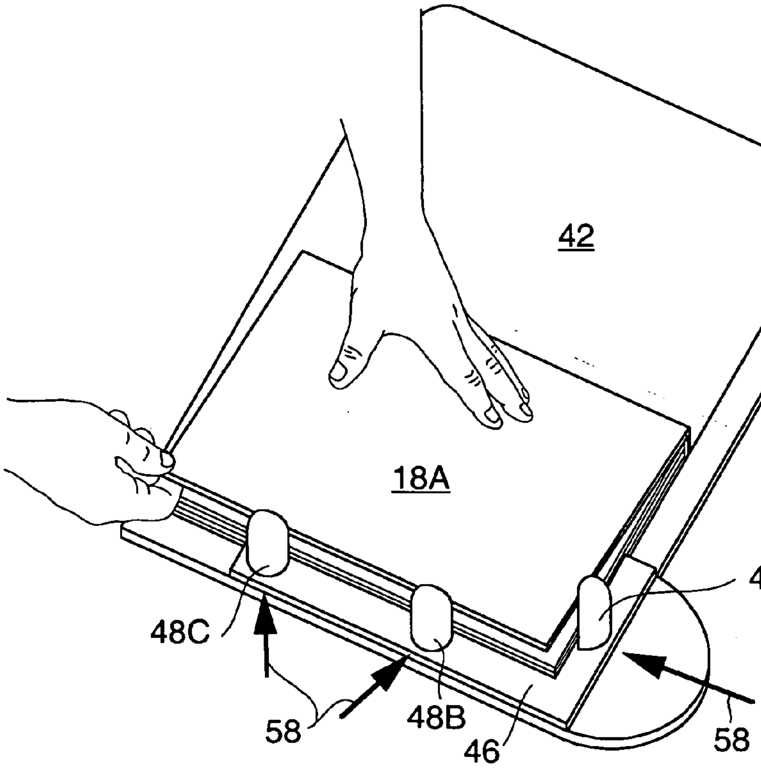
FIG. 8L (PRIOR ART)
Figure 8M:
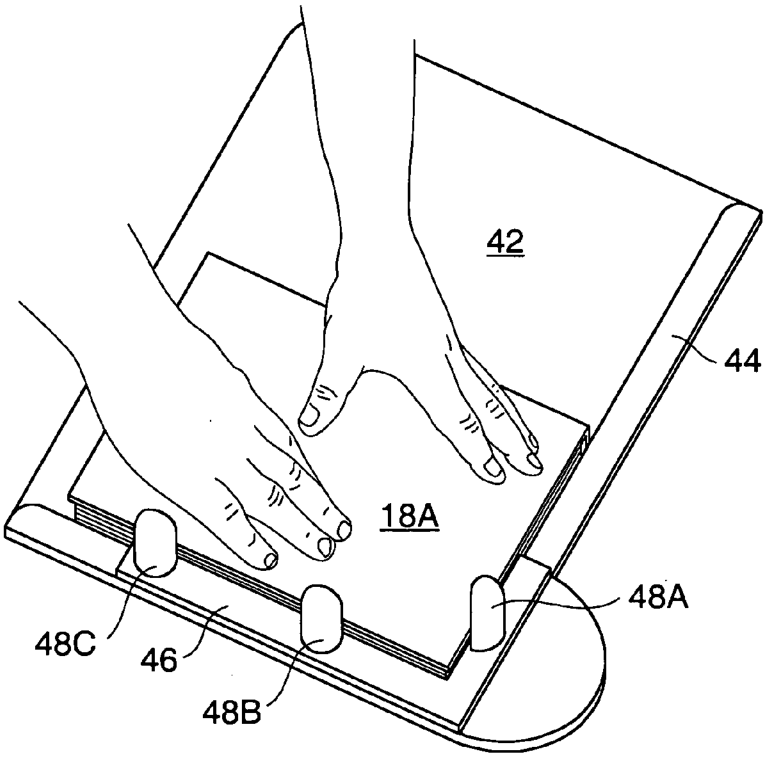
FIG. 8M (PRIOR ART)
Figure 9A:
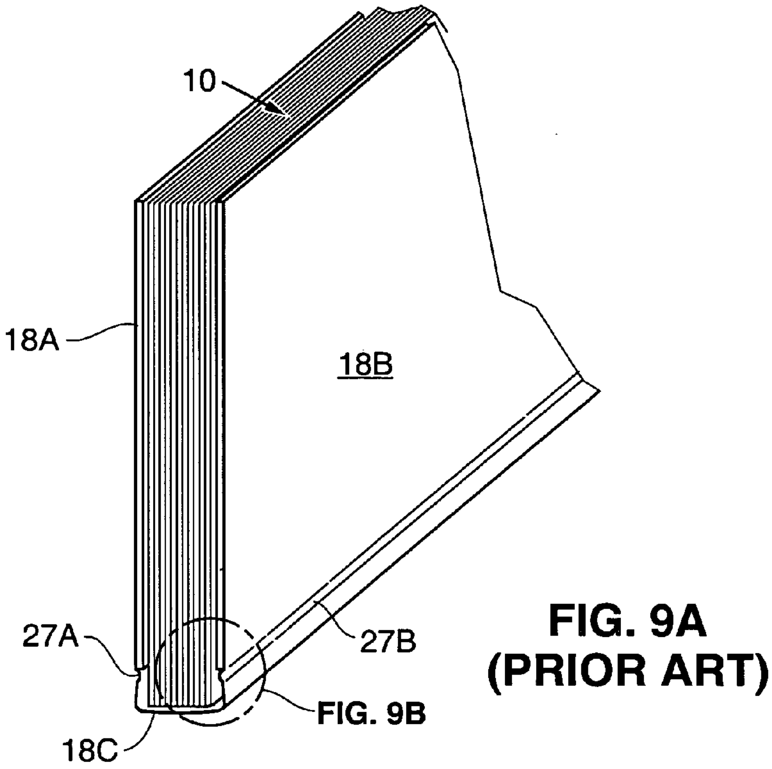
FIG. 9A (PRIOR ART)
FIGS. 9A and 9B are perspective views of portions of the completed book in accordance with the prior art.
Figure 9B:
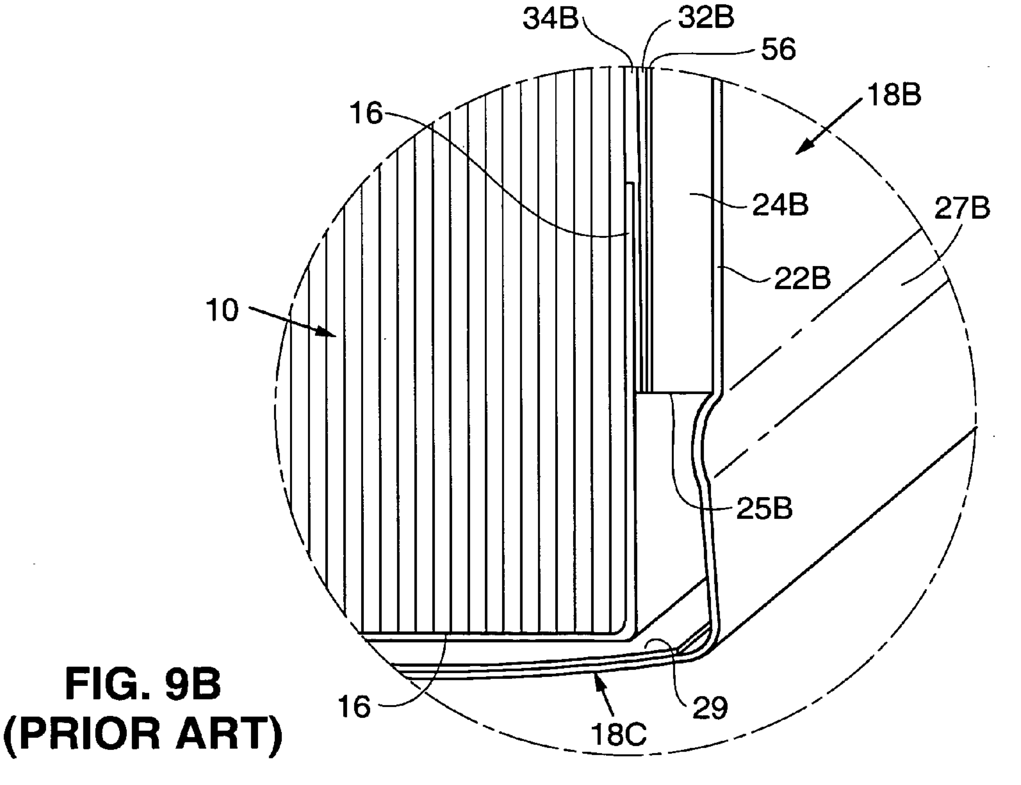
FIG. 9B (PRIOR ART)
Figure 10:
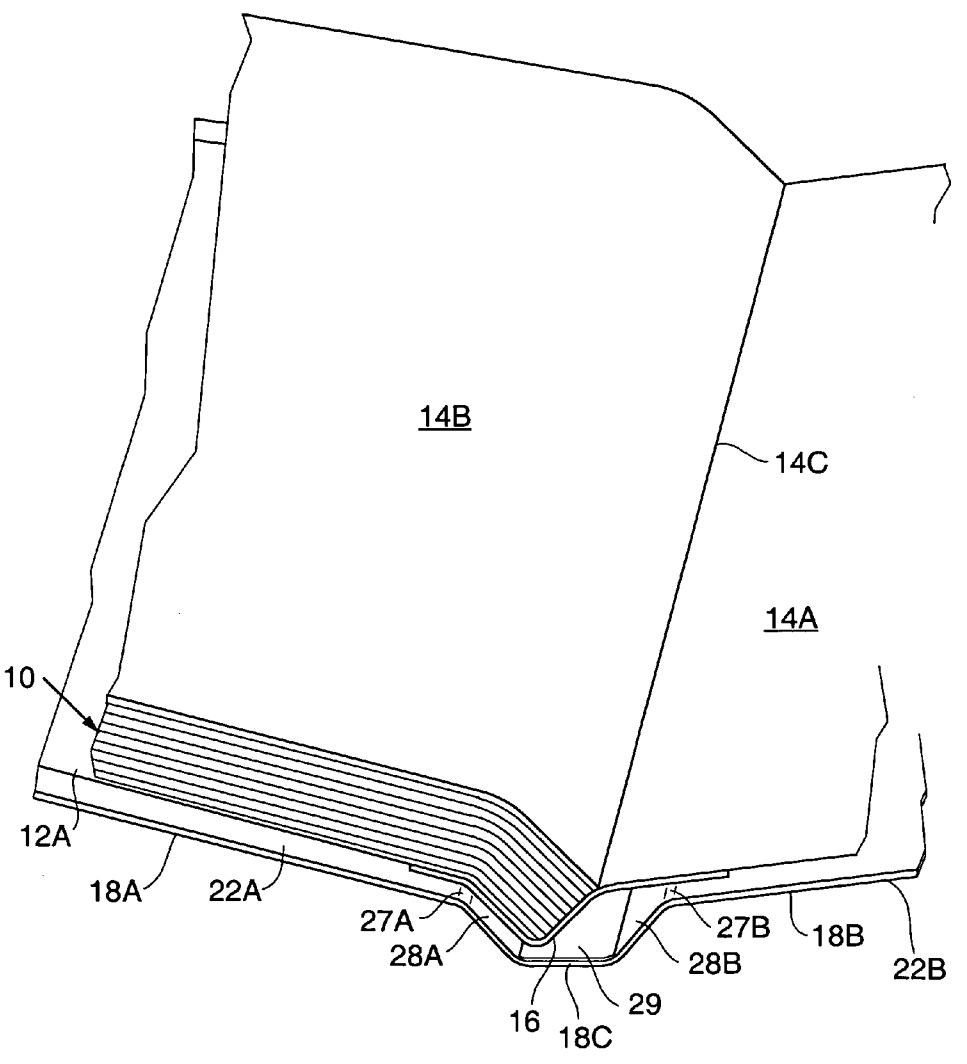
FIG. 10 (PRIOR ART)
FIG. 10 is a perspective broken view of the completed prior art book shown in an open position.
Figure 16:
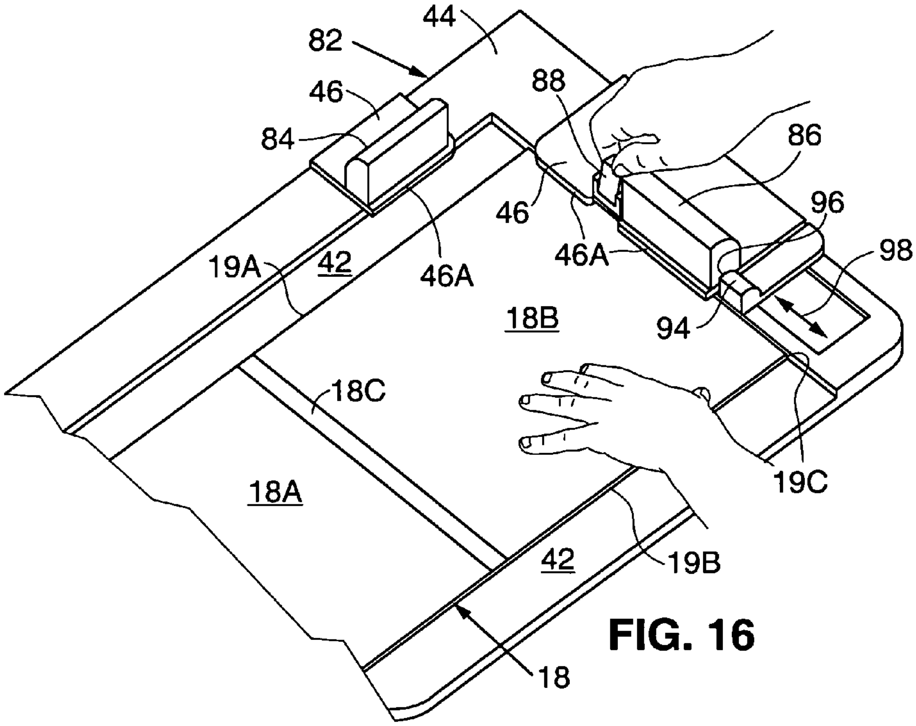
FIG. 16 is a perspective view of a prior art hardcover assembly being positioned in a prior art cover guide.

Once the cut wrap sheet 62 is produced, the wrap sheet must be properly aligned with respect to the hardcover assembly 18. The alignment and application of the wrap sheet 62 to the hardcover assembly is performed prior to application of the hardcover assembly to be bound stack as described in connection will FIGS. 8A–8M. Referring to FIG. 16, a prior art cover guide 82, similar to cover guide 40 shown in FIG. 6, is used for a second novel function in the present application. The hardcover assembly 18 is placed on the working surface 42 of the guide, with the outer portions of the assembly 18A, 18B and 18C facing upwards, the reverse of the arrangement depicted in FIG. 8A. Cover portion 18B, which will form the front cover of the book, has an outer edge 19C which is positioned under ledge member 46 so that the edge 19C is positioned contacting the edge 44A as shown in FIG. 7, except that there is no stack 10 at this point and the outer side of cover portion 18B is facing in the opposite direction so that the outside of the portion is facing upward. A manually actuated clamp 88, which is part some prior art guide apparatus including guide apparatus 82, is used to hold the cover assembly in place. The clamp 88 is disposed so that it secures the cover assembly in place without interfering with the use of edge 46A as a guide element. The location of the upper edge 19A of the cover assembly 18 is not critical, with upper edge 19A being positioned approximately one inch from the edge of stop 84.

As previously noted in connection with Table 1, the widths of the stack to be bound fall in ranges A, B, C, D, E and F. The stack width can be measured directly using the table to determine the range or a gauge which is part of the prior art cover guide 82 can be used. The gauge includes a movable grip member 94 (FIG. 16) that can be moved relative to stop 86, with there being defined between member 94 and stop 86 a stack receiving space 96. The user places the stack to be bound in space 96 and then moves member 94 against the edge of the stack so that the width of space 96 corresponds to the thickness of the stack. The movable grip member 94 is coupled to a movable indicator which designates indicia "A","B","C","D","E" or "F" depending on the stack thickness. Some prior art hardcover assemblies 18 have a letter designation printed in the inside of the spine 26 (FIG. 8A) that depicts the size of the stack which can be covered using the assembly. As will be described, a width adjust guide is used in the present application for books having spines greater than A.

Figure 17:
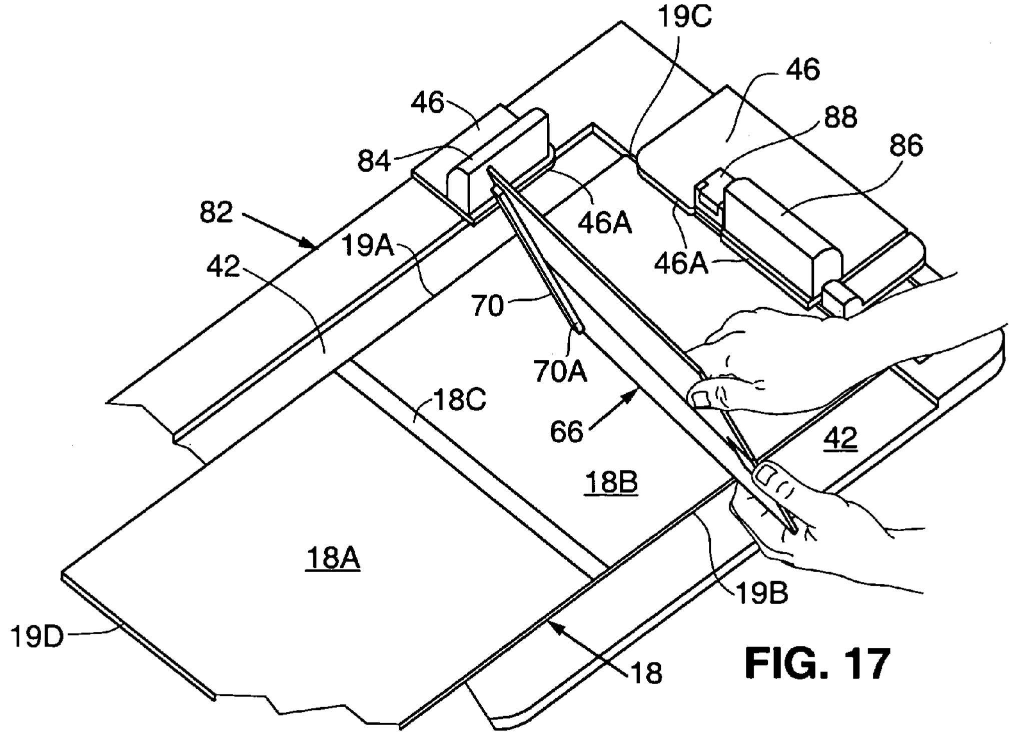
FIGS. 17 and 18 shows the wrap guide tool being positioned over the hardcover assembly.
Figure 18:
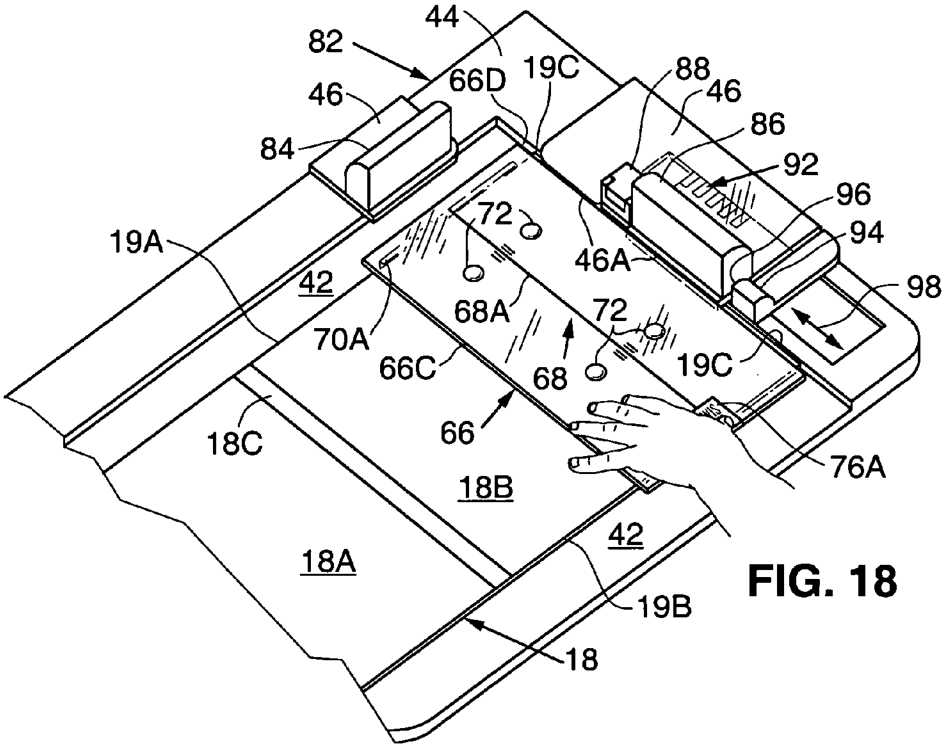

Assuming that the spine width is A, the user places the guide tool 66 over section 18B of the hardcover guide 82 as shown in FIGS. 17 and 18. The guide tool 66 is positioned with the cushions 72 facing upward and the lip 70 facing down so that logo 76A is shown. The inner edge 70A (FIG. 12B) of the lip (lip 70 itself is not depicted in FIG. 18 for purposes of clarity) is positioned so that it engages edge 19A of the hardcover assembly. Lateral edge 66D of the guide tool is positioned abutting edge 46A of the ledge member 46 as can best be seen in FIG. 27A. With the edges so aligned, the position of the guide tool 66 relative to the hardcover assembly is fixed in the proper position.

Figure 21:
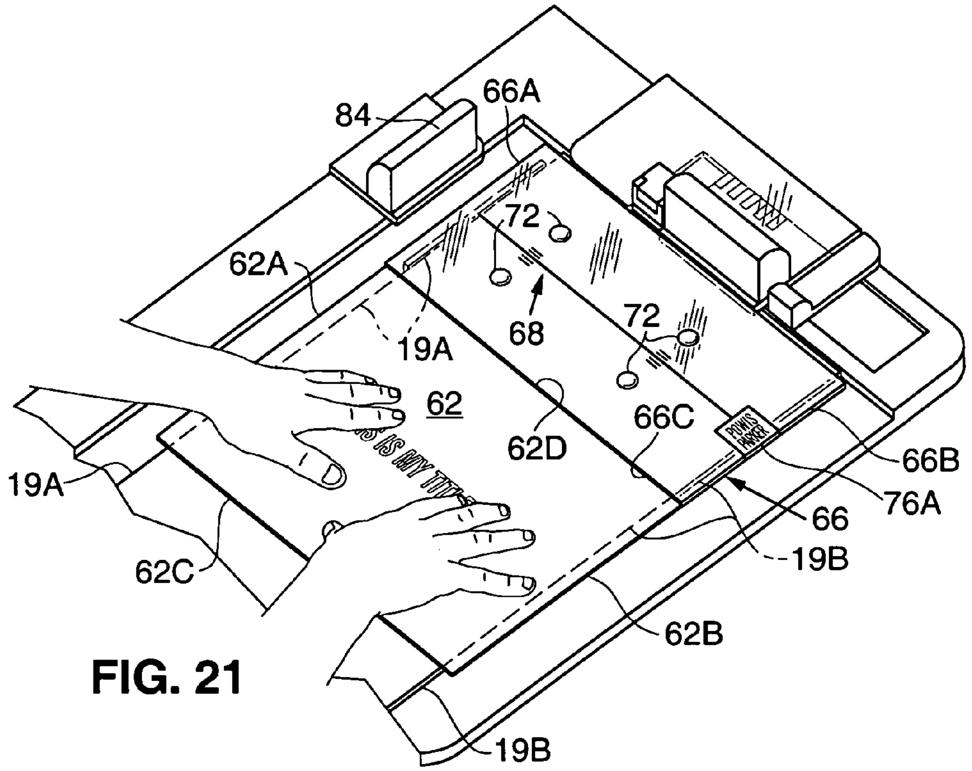
FIG. 21 shows the cut wrap sheet being positioned over the hardcover assembly using the wrap guide tool for alignment.

The guide tool 66 is then used to accurately position the cut wrap member 62 on the hardcover assembly 18. The wrap member 62 will eventually be positioned on the hardcover assembly with edge 62D of the wrap sheet being positioned adjacent edge 66C of the guide tool as shown in FIG. 21 and with either the edge 62A aligned of the with edge 66A of the tool or edge 62B aligned with edge 66B of the tool.

Figure 19:
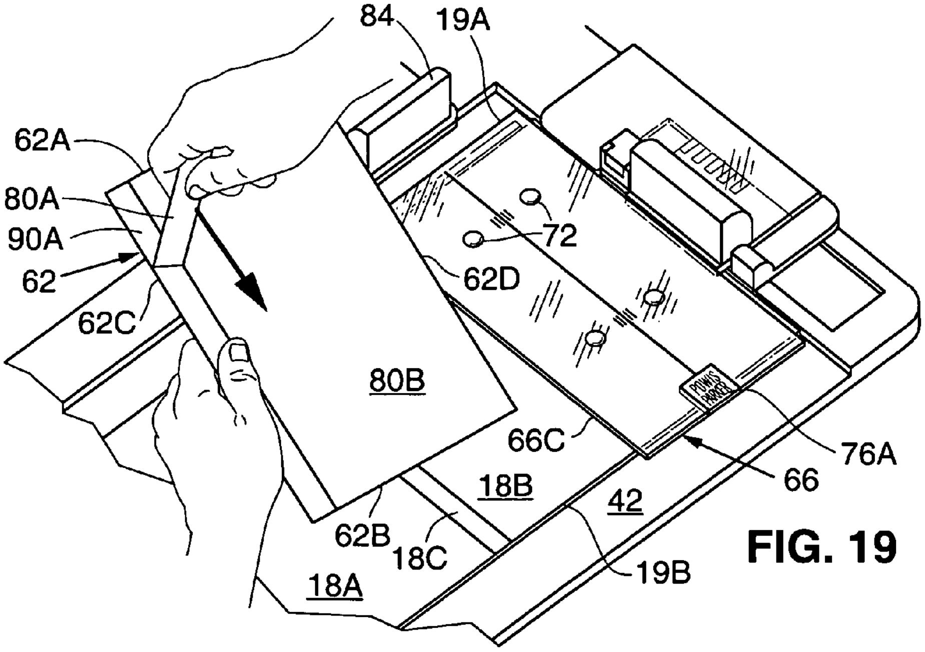
FIG. 19 shows a first release liner being manually separated from the cut wrap sheet prior to application to the hardcover assembly, exposing part of the underlying pressure sensitive adhesive.
Figure 22:
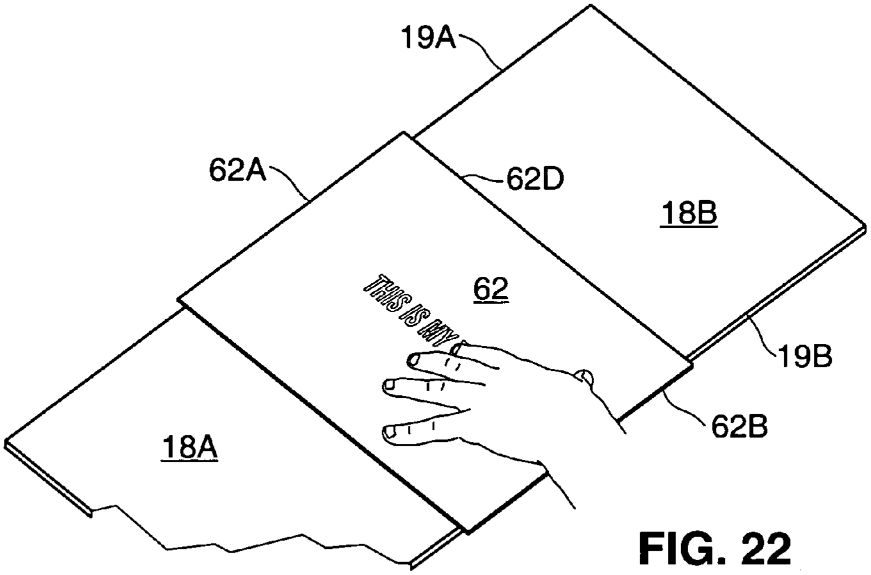
FIG. 22 depicts the cut wrap sheet being pressed against the hardcover assembly so that the wrap sheet is secured in place by the pressure sensitive adhesive.

Referring back to FIG. 19, prior to the positioning of the cut wrap sheet 62, the minor release layer 80A of the wrap sheet 62 is manually removed, exposing a strip 90A of pressure sensitive adhesive. The wrap sheet is then preferably positioned relative to the edges of the guide tool as previously described, with the only the major release liner 80B contacting the cover section 18B and without any of the thin strip of exposed pressure sensitive adhesive 90A contacting anything. The two orthogonal edges of the wrap sheet are properly aligned as previously described, with wrap sheet edge 62D abutting edge 66C, with the major release liner 80B still being in place so that none of the adhesive contacts the hardcover assembly at this point. While holding the wrap sheet in place with one hand to prevent sheet movement, the user moves the other hand across the wrap sheet surface starting at edge 62D and moving towards edge 62C where the exposed adhesive is located. This movement causes the wrap sheet 62 to adhere to the hardcover in the region adjacent edge 62C, thereby fixing the wrap sheet to the hardcover with the proper orientation. The user then lifts the wrap sheet near edge 66C, without disturbing adhered edge 62C, so that the major release liner can be removed and exposing the remainder of the adhesive. The user than places a hand near edge 62C and moves the hand toward edge 62C as shown in FIG. 22, forcing the remainder of the wrap sheet against the hardcover assembly without entrapping any air between the sheet and the hardcover. Further hand movement over wrap sheet insures that the sheet is properly secured.

Figure 20:
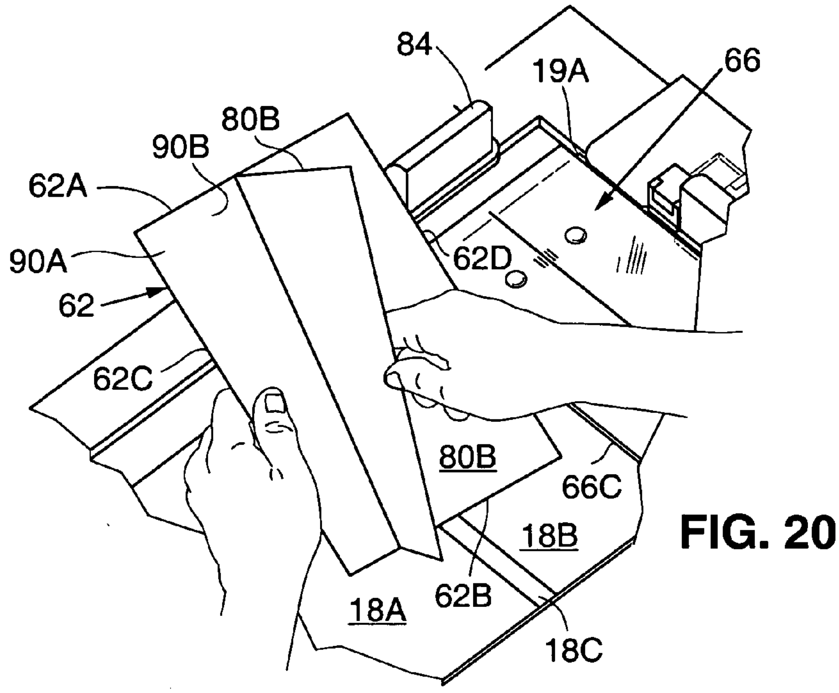
FIG. 20 shows a second release liner being manually separated from the cut wrap sheet exposing the remainder of the pressure sensitive adhesive.

Rather than using this two step sequence of removing the release liners 80A and 80B, both liners can be removed as shown in FIG. 20 before application of the wrap sheet to the hardcover assembly. The two-step approach is preferred particularly if an aggressive adhesive is used. Once the wrap sheet adhesive contacts the hardcover, it is important that there be correct wrap sheet alignment. If there is not proper alignment, it is necessary to separate the wrap sheet from the hardcover and make a second attempt. With the two-step approach, proper alignment is easily achieved by placing the wrap sheet in the region over the release liner over the cover section 18B so that there is no adhesive contact prior to proper alignment. It is only after proper alignment that the user forces adhesive 90A against cover section 18A thereby securing the wrap sheet in position.

Once the user has completed pressing the wrap sheet in place as shown in FIG. 22, it can be seen that sections of the wrap sheet along edges 62A and 62B overhang the respective edged 19A and 19B of the hardcover assembly. As previously noted, the spacing between the surface 70A of lip 70 and edge 66A of the guide tool 66 is selected to be ⅜ of an inch so the length of the cut wrap sheet will be ¾ of an inch greater than the length of the book. This total overhang is divided between both edges of the hardcover so that the overhang at each opposing edge 19A and 19B of the hardcover is ⅜ of an inch.

Figure 23:
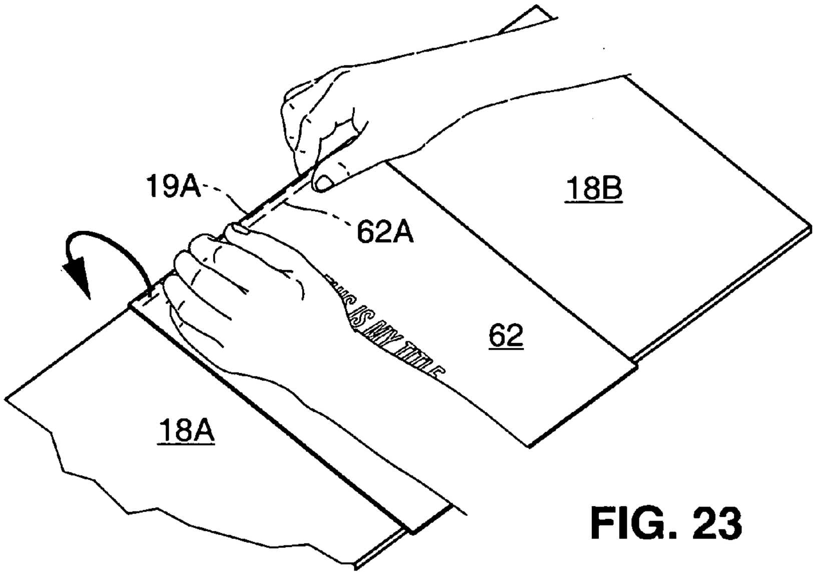
FIG. 23 shows one edge of the wrap sheet being folded around an edge of the hardcover assembly.

The user then manually wraps the overhanging edges of the wrap sheet 62 around the edges 19A and 19B of the hardcover assembly as shown in FIG. 23, with the wrapped overhang being held in place by the pressure sensitive adhesive. This completes the preparation of the hardcover assembly 18. The assembly can then be applied to a bound stack as previously described in connection with FIGS. 8A–8M thereby completing the binding process.

Figure 24:
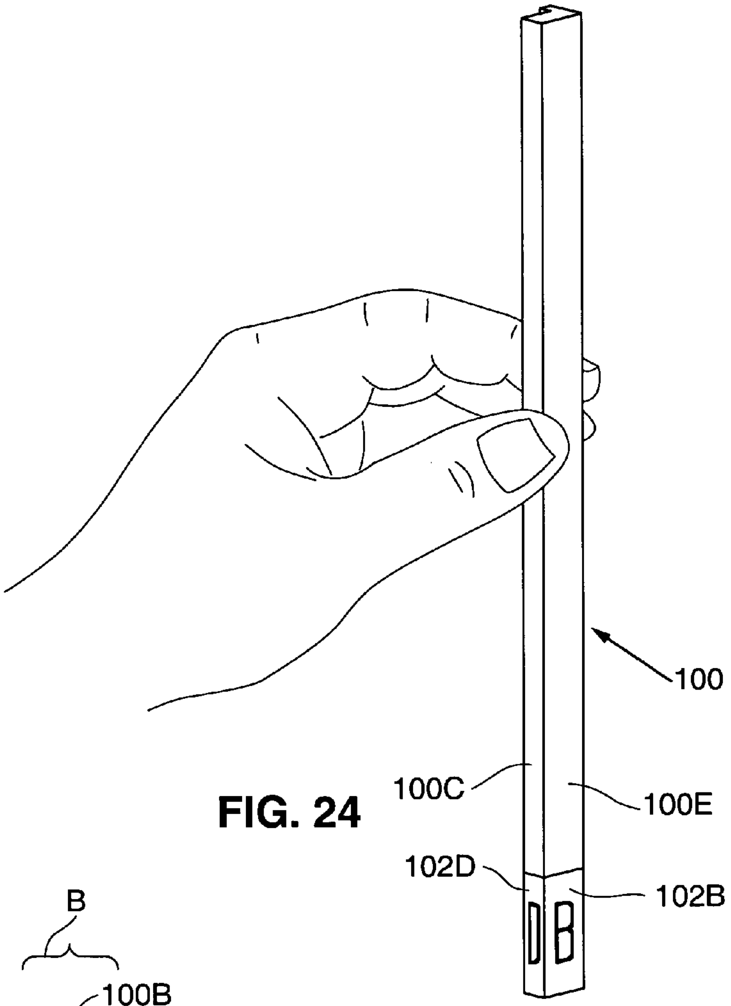
FIG. 24 is a perspective view of a spine width adjust guide in accordance with another aspect of the present invention providing spacing adjustments to accommodate books having four additional spine widths.
Figure 25:
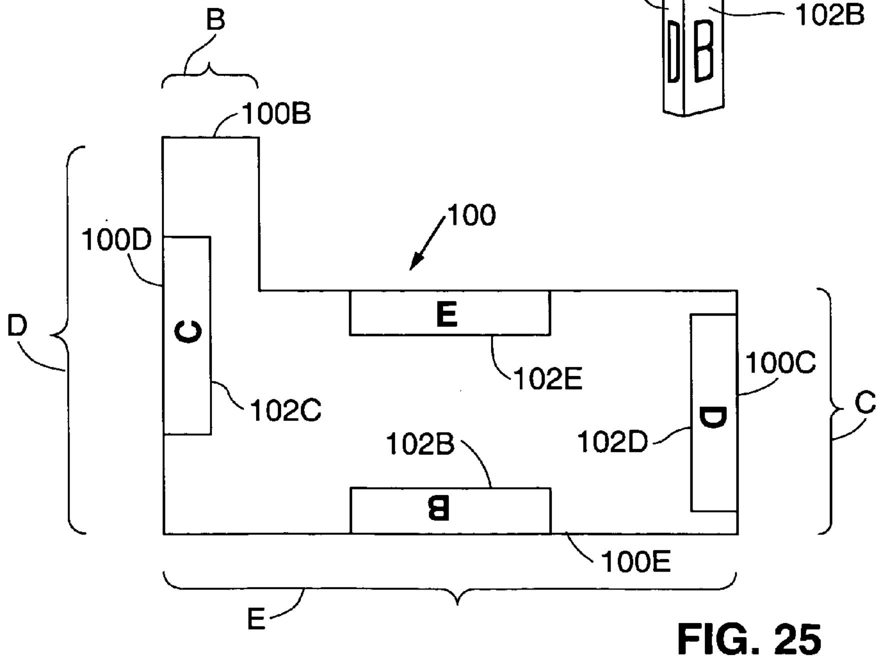
FIG. 25 is an end view of the spine width adjust guide of FIG. 24.
Figure 27A:
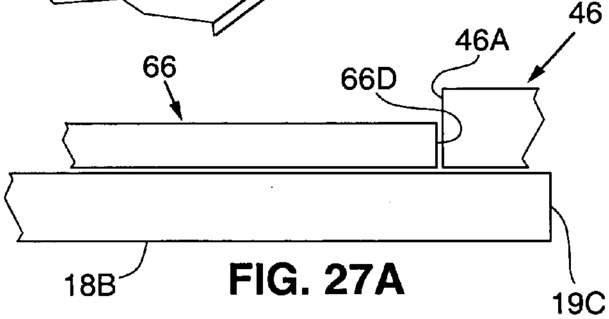
FIGS. 27A, 27B, 27C, 27D and 27E are end views of a section of the wrap guide tool in place, with 27A showing the arrangement for books having a narrow width spine where no spine width adjust guide is used and with FIGS. 27B–27E showing the spine width adjust guide in appropriate positions to accommodate spine widths of increasing value.

In the event the hardcover assembly 18 is for a book having a width greater than A (Table 1), it is necessary to adjust the position of the guide tool 66 on the cover guide 82 from that depicted in FIGS. 18 and 27A. This is preferably accomplished using a width adjust guide 100 as shown in FIGS. 24 and 25. Adjust guide 100 can be used to provide proper positioning of the guide tool 66 on the cover guide 82 for spine widths greater than A widths including B, C, D and E widths.

Figure 26:
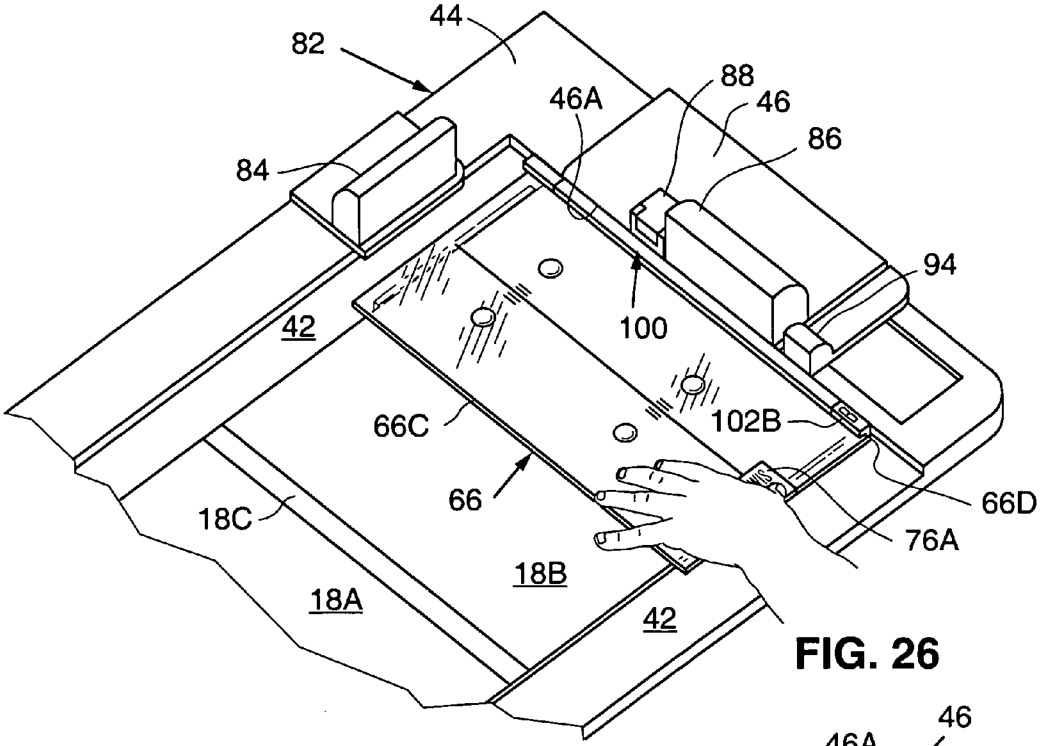
FIG. 26 shows the spine width adjust guide positioned intermediate the wrap guide tool and the edge of the ledge member of the hardcover guide.
Figure 27B:
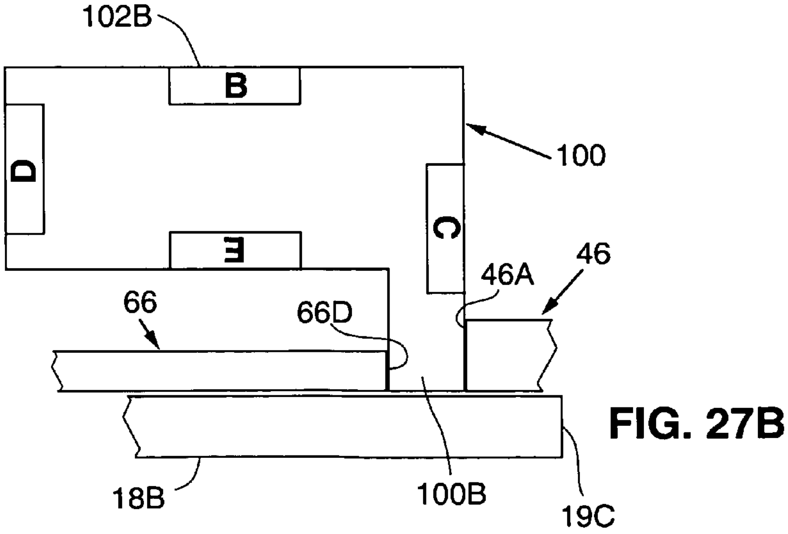

The adjust guide 100, which is preferably fabricated from acrylic plastic, is at least about six inches in length and has an exemplary approximate L-shaped cross-section as shown in FIG. 25. The object of the adjust guide 100 is to adjust the position of the guide tool 66 so that, when the wrap sheet 62 is positioned adjacent the guide tool as shown in FIG. 21, the text printed on the wrap sheet will fall in the center of the spine section 18C (FIG. 19) of hardcover assembly 18. As can be seen in FIG. 25, the adjust guide 100 L-shaped cross-section defines a total of four spacing members, including member 100B which provides spacing for B width hardcover assemblies, member 100C for C width hardcover assemblies, member 100D for D width hardcover assemblies and 100E for E hardcover assemblies. Indicia “B”, “C”, “D” and “E”, designated respectively by 102B, 102C, 102D and 102E are printed on the respective sides of the width adjust guide 100, opposite the related spacing member. The “B” indicia 102B and the “D” indicia 102D are disposed at one end of the width adjust guide and the “C” indicia 102C and the “E” indicia 102E are at the opposite end. When the user properly positions the width adjust guide 100, the appropriate indicia is at the upper visible surface of the guide, just to the right of the logo 76A. Thus, as can be seen in FIGS. 26 and 27B, when a B width hardcover assembly is to be used, the width adjust guide is positioned with the “B” indicia 102B facing the user, opposite logo 76A. As will be seen, when the C and E widths are to be used, it is necessary to reverse the position of the width adjust guide 100 and to rotate the guide so that the “C” and “E” indicia 102C and 102E are facing up and disposed to the right of logo 76A.

With the guide 100 positioned as shown in FIGS. 26 and 27B, spacing member 100B is positioned intermediate edge 66D of the guide tool 66 and edge 46A of the ledge member 46. Spacing member 100 has a width of 1⁄16 of an inch which causes the guide tool 66 being displaced a distance such that the printed information 64 will be centered on a B width spine rather than an A width spine. Note that the B indicia 102B is printed on the guide 100 with an orientation such that, when viewed from a user as shown in FIG. 26, the indicia is upright so that the spacing member 100B is on the right hand side as shown in FIG. 27B, with the body of the tool 100 extending over the guide tool 66 rather than over ledge member 46 in which case the stop 86 (FIG. 26) would block proper placement. With upright orientation of indicia B, the guide 100 has the proper orientation so that the spacing member 100B can be positioned intermediate edges 66D and 46A as desired.

Figure 27C:
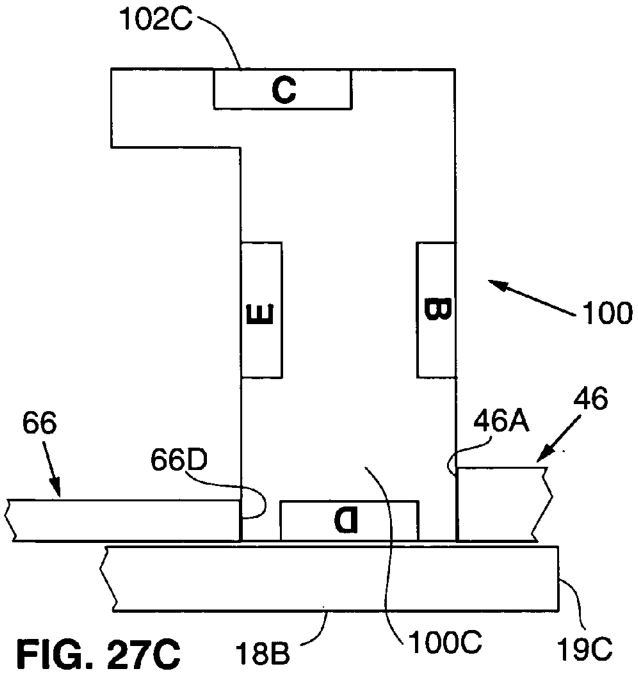
Figure 27D:
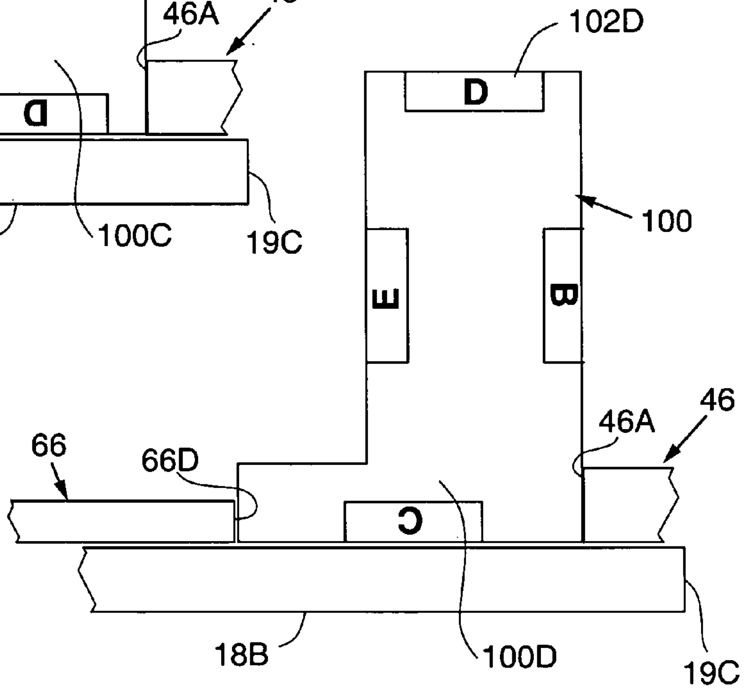
Figure 27E:
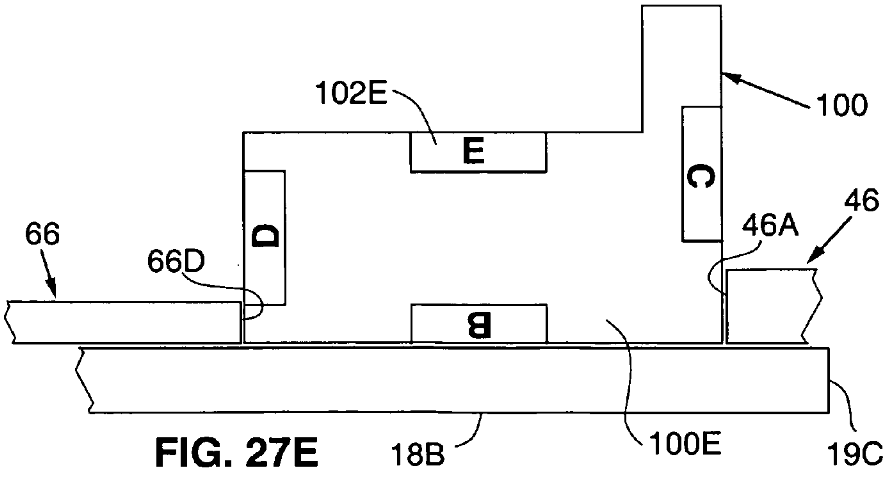

Once the adjustment guide 100 is in position, the user repeats the previously described steps for applying the wrap sheet 62 to the type B hardcover assembly 18. Those steps include positioning the guide tool 66 on the hardcover assembly with edge 70A of lip 70 contacting edge 19A of the hardcover, but with edge 66D contacting the width adjust guide 100 rather than edge 46A. The next step is positioning the wrap sheet 62 on the hardcover using guide tool 66 as a guide. FIGS. 27C–27E show the proper orientation for the width adjust guide 100 for widths C, D and E, respectively. Note that in FIGS. 27C and 27E, the width adjust guide 100 is reversed from position shown in FIG. 26 so that “C” and “E” indicia 102C and 102E are to the right of logo 76A rather than the “B” and “D” indicia 102B and 102D.

The spacing members 100C, 100D and 100E associated with sizes C, D and E have widths of 3⁄16, 5⁄16 and 7⁄16 of an inch, respectively, to provide the correct adjustment from size A to size C, D and E hardcover assemblies. Note in each case the appropriate indicia 102C, 102D and 102E is disposed on the upper-most portion of the guide so that the user can rely upon the indicia for proper guide orientation. The exemplary width adjust guide 100 does not provide adjustments for size F hard covers as previously noted.

As previously noted, the dimensions of the guide tool 66 define the size of the wrap sheet 62 and thus depend upon the format of the book to which the wrap sheet 62 will be applied. The length of the guide 66 and wrap sheet 62 in the direction of the book spine are determined simply by the adding some length to the guide between edges 66A and 66B (FIG. 14) to provide the desired over wrap around edges 19A and 19B of the hardcover assembly (FIG. 16). The width of the guide 66 between edges 66C and 66D defines both (1) the width of the cut wrap sheet 62 when the guide is used as a template and (2) the location of the wrap sheet 62 on the hardcover assembly 18 as previously described. One exemplary method of selecting the proper guide 66 width that meets both criteria will now be described.

Figure 28:
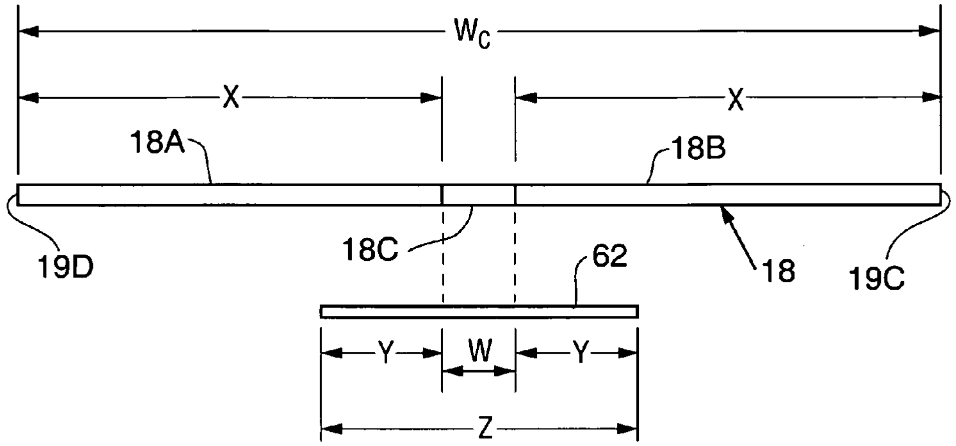
FIG. 28 is a schematic representation of the hardcover assembly and the cut wrap sheet showing the relative dimensions.

FIG. 28 depicts a schematic representation of a side view of the hardcover assembly 18. As can be seen, the width $W_C$ of the hardcover assembly, including the spine section 18C of the front and back cover halves 18A and 18B can be expressed as follows:

$$W_C = X + W + X \text{ or}$$

$$W_C = 2X + W \quad (1)$$

where X is the width of the cover halves 18A/B and where W is the width of the spine section 18C.

As also shown in FIG. 28, the width Z of the cut wrap sheet 62 (and also guide 66) can be expressed as follows:

$$Z=Y+W+Y \text{ or}$$

$$Z=2Y+W \quad (2)$$

where Y is the length of that portion of the
wrap sheet 62 that extends over the cover halves 18A/B.

Figure 29:
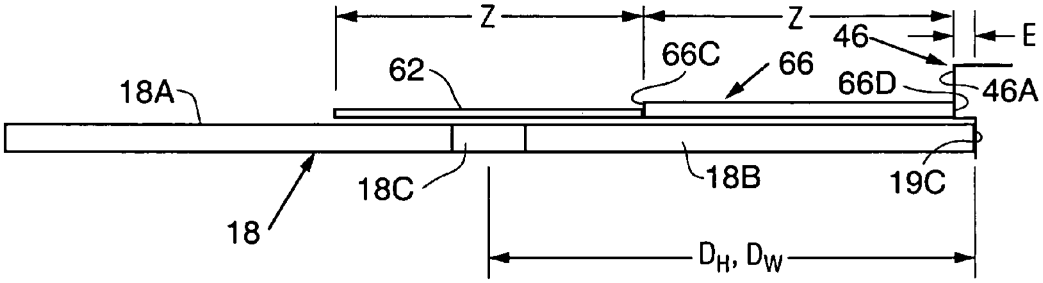
FIG. 29 is a schematic representation of the hardcover assembly, the guide tool and the cut wrap sheet showing the relative dimensions.

FIG. 29 is a further schematic representation of the cover assembly 18A positioned in the cover guide 82, such as shown in FIG. 21, with the cut wrap sheet 62 being located over the cover assembly 18 based upon the width of the guide tool 66. Note that, as also shown in FIG. 27B, edge 19C of the hardcover assembly and edge 66D are displaced from one another a distance E due to the presence of ledge member 46 of the cover guide 82 (see also FIG. 7). The distance $D_H$ of the center of the hardcover assembly to edge 19C is, by inspection, as follows:

$$D_H=X+W/2 \quad (3)$$

The distance $D_W$ of the center of wrap sheet 62 from the reference line defined by edge 19C is, also by inspection, as follows:

$$D_W Z/2+Z+E \text{ or } 3Z/2+E \quad (4)$$

In order for proper centering of wrap sheet on the hardcover the following criteria must be met:

$$D_H=D_W \text{ or}$$

$$X+W/2=3Z/2+E \quad (5)$$

If the value of Z of equation (2) is substituted into equation (5), the following simplified results are obtained:

$$Y=(X-W-E)/3 \quad (6)$$

If typical values associated with an 8.5 inch by 8.5 inch format book of A width per Table 1 are substituted into equation (6) for X (8.64 inches), for W (0.75 inches) and for E (0.14 inches), the value of Y is approximately 2.58 inches. Thus, as indicated in equation (2), the width Z of the guide 66 and wrap sheet 62 is 5.91 inches. Note that it has been found that when the guide tool 66 is used as a template for cutting the wrap sheet 62, a typical user cuts the wrap sheet slightly larger than the tool, primarily due to the finite width of the cutting blade. Accordingly, a small adjustment can be made to the guide tool, by reducing the width of the tool by about 0.025 of an inch to compensate for the blade thickness. Thus, the width Z of the guide tool is reduced to approximately 5.89 inches. Although guide tool 66 of this width have been found suitable for book formats where the width is denominated as "8½", including 8½ by 8½ inches and 8½ by 11 inches, guide tool widths between 5.4 to 6.4 inches provide much of the benefit of the present invention.

Thus, a novel method for preparing and applying a wrap sheet to a hardcover assembly has been disclosed along with related apparatus. Although various embodiments of the subject invention have been described in some detail, it is to be understood that certain changes can be made by those skilled in the art without departing from the spirit and scope of the present invention as defined by the appended claims.

The invention claimed is:

1. Apparatus for forming and applying a wrap sheet to a hardcover for a bound book, with the hardcover including first and second cover sections and an intermediate spine section, with the first and second cover sections having a similar width and with the first and second cover sections and the spine section having a similar length, said apparatus including:

a generally planar guide having a guide width that is greater than the width of the spine section and less than the sum of the width of the first and second cover section and the spine section and a guide length greater than the length of the length of the spine section, with the planar guide including first and second opposite edges that extend along the length of the planar guide and third and fourth opposite edges that extend along the width of the planar guide;

a reticule disposed along the length of the planar guide, intermediate the first and second edges and equally spaced from the first and second edges, with the planar guide being substantially transparent at least in a location on which the reticule is disposed;

at least one anti-skid member disposed on a first surface of the planar guide; and a lip member disposed on a second surface, opposite the first surface, of the planar guide along the third edge, with the lip member extending away from the second surface to form an cover engaging surface parallel to the third edge and substantially normal to the second surface.

2. The apparatus of claim 1 further including a plurality of spaced apart anti-skid members.

3. The apparatus of claim 1 wherein the planar guide length is between 8 and 12 inches and the planar guide width is less than 8 inches.

4. The apparatus of claim 1 further including an elongated width adjust guide which includes a first spacing member disposed along a length of the width adjust guide, with the first spacing member defining a first edge for engaging the second edge of the planar guide and a second edge for engaging a reference surface and a second spacing member disposed along a length of the width adjust guide, with the second spacing member defining a first edge for engaging the second edge of the planar guide and a second edge for engaging the reference surface, with the first and second edges of the second spacing member being spaced apart a distance greater than a distance between the first and second edges of the first spacing member.

5. The apparatus of claim 4 wherein the width adjust includes a first indicia that is related to the distance between the first and second edges of the first spacing member and a second indicia, different from the first indicia, that is related to the distance between the first and second edges of the second spacing member, with first indicia being visible to a user when the first spacing member first edge is engaging the second edge of the planar guide and with the second indicia being visible to the user when the second spacing member first edge is engaging the second edge of the planar guide.

6. The apparatus of claim 4 wherein the width adjust guide further includes a third spacing member disposed along the length of the width adjust guide, with the third spacing member defining a first edge for engaging the second edge of the planar guide and a second edge for engaging the reference surface, with the first and second edges of the third spacing member being spaced apart a distance greater than the distance between the first and second edges of the second spacing member.

7. The apparatus of claim 6 wherein the first and second edges of the first, second and third spacing members include at least one common edge.

8. The apparatus of claim 6 wherein the width adjust guide includes a first indicia that is related to the distance between the first and second edges of the first spacing member, a second indicia, different from the first indicia, that is related to the distance between the first and second edges of the second spacing member and a third indicia different from the first and second indicia related to the distance between the first and second edges of the third spacing member, with first indicia being visible to a user when the first spacing member first edge is engaging the second edge of the planar guide, with the second indicia being visible to the user when the second spacing member first edge is engaging the second edge of the planar guide and with the third indicia being visible to the user when the third spacing member first edge is engaging the second edge of the planar guide.

9. The apparatus of claim 8 wherein the width adjust guide has a generally L-Shaped cross-section.

10. Apparatus for use in combination with a planar guide for applying a wrap sheet to a hardcover, said apparatus including:

an elongated width adjust guide which includes a first spacing member disposed along a length of the width adjust guide, with the first spacing member defining a first edge for engaging an edge of the planar guide and a second edge for engaging a reference surface and a second spacing member dispose along the length of the width adjust guide, with the second spacing member defining a first edge for engaging the edge of the planar guide and a second edge for engaging a reference surface, with the first and second surfaces of the second spacing member being spaced apart a distance greater than a distance between the first and second surfaces of the first spacing member; and first indicia, disposed on the width adjust guide, that is related to the distance between the first and second edges of the first spacing member and a second indicia, different from the first indicia, disposed on the width adjust guide that is related the distance between the first and second edges of the second spacing member, with first indicia being visible to a user when the first spacing member first edge is engaging the edge of the planar guide and with the second indicia being visible to the user when the second spacing member first edge is engaging the edge of the planar guide.

11. The apparatus of claim 10 wherein the width adjust guide further includes a third spacing member disposed along the length of the width adjust guide, with the third spacing member defining a first edge for engaging the edge of the planar guide and a second edge for engaging the reference surface, with the first and second edges of the third spacing member being spaced apart a distance greater than the distance between the first and second edges of the second spacing member and further including third indicia that is related to the distance between the first and second edges of the third spacing member and different from the first and second indicia, with the third indicia being visible to the user when the third spacing member first edge is engaging the edge of the planar guide.

12. The apparatus of claim 11 wherein the first, second and third indicia are disposed on first, second and third separate respective planar surfaces of the width adjust guide.

13. A method of forming and applying a wrap sheet to a hardcover for a bound book, said method comprising:

cutting a wrap sheet to a desired size using a periphery of a planar guide as a template to produce a cut wrap sheet;

positioning the hardcover on a receiving surface, with the outer surface of the hardcover exposed and with an edge of the hardcover being at a fixed position with respect to a reference surface;

positioning the planar guide over the hardcover, with a first edge of the planar guide being at a predetermined distance with respect to the reference surface; and positioning the cut wrap sheet over the outer surface of the hardcover, with a first edge of the cut wrap sheet being aligned with a second edge, opposite the first edge, of the planar guide; and securing the cut wrap sheet to the hardcover.

14. The method of claim 13 wherein the hardcover has plurality of possible spine widths and wherein said positioning the planar guide includes adjusting the predetermined distance based upon the spine width of the hardcover.

15. The method of claim 14 wherein the plurality of possible widths includes first, second and third increasing spine widths and wherein said positioning the planar guide includes positioning the planar guide so that the first edge of the planar guide abuts the reference surface for hardcovers of the first width spine, positioning the first edge a first predetermined distance from the reference surface for hardcovers of the second width spine and positioning the first edge a second predetermined distance from the reference surface for hardcovers of the third width spine, with the second predetermined distance being greater than the first predetermined distance.

16. The method of claim 15 wherein the positioning of the first edge a first predetermined distance and the positioning the first edge a second predetermined distance are both carried out using a single width adjust guide.

17. The method of claim 13 wherein the planar guide include a reticule disposed in a center of the planar guide and wherein the method further includes, prior to the cutting, positioning the planar guide over wrap sheet using the reticule.

18. The method of claim 17 wherein the wrap sheet includes printed matter to be positioned over a spine section of the hardcover and wherein the positioning of the planar guide includes aligning the reticule with the printed matter.

19. Apparatus for forming and applying a wrap sheet to a hardcover for a bound book, with the hardcover including first and second cover sections and an intermediate spine section, with the first and second cover sections having a similar width and with the first and second cover sections and the spine section having a similar length, said apparatus including:

a generally planar guide having a guide width that falls between 5.4 to 6.4 inches and a guide length greater than the length of the length of the spine section, with the planar guide including first and second opposite edges that extend along the length of the planar guide and third and fourth opposite edges that extend along the width of the planar guide;

a reticule disposed along the length of the planar guide, intermediate the first and second edges and equally spaced from the first and second edges, with the planar guide being substantially transparent at least in a location on which the reticule is disposed; and at least one anti-skid member disposed on a first surface of the planar guide.

20. The apparatus of claim 19 further including a lip member disposed on a second surface, opposite the first surface, of the planar guide along the third edge, with the lip member extending away from the second surface to form an cover engaging surface parallel to the third edge and substantially normal to the second surface.

21. The apparatus of claim 19 wherein the planar guide defines an opening extending through the guide, said opening being of a sufficient size to permit only partial passage of a hand of a user through the opening so that the hand contacts both the guide and an underlying wrap sheet.

* * * * *